US011412276B2

United States Patent
Bloch et al.

(10) Patent No.: US 11,412,276 B2
(45) Date of Patent: Aug. 9, 2022

(54) SYSTEMS AND METHODS FOR PARALLEL TRACK TRANSITIONS

(71) Applicant: JBF Interlude 2009 LTD—Israel, Tel Aviv-Jaffa (IL)

(72) Inventors: Jonathan Bloch, Brooklyn, NY (US); Barak Feldman, Tenafly, NJ (US); Tal Zubalsky, Brooklyn, NY (US); Yuval Hofshy, Kfar Saba (IL); Alon Benari, Brooklyn, NY (US); Matan Ariel, New York, NY (US)

(73) Assignee: JBF Interlude 2009 LTD, Tel Aviv (IL)

( * ) Notice: Subject to any disclaimer, the term of this patent is extended or adjusted under 35 U.S.C. 154(b) by 0 days.

(21) Appl. No.: 14/534,626

(22) Filed: Nov. 6, 2014

(65) Prior Publication Data
US 2016/0105724 A1 Apr. 14, 2016

Related U.S. Application Data

(60) Provisional application No. 62/062,435, filed on Oct. 10, 2014.

(51) Int. Cl.
| | | |
|---|---|---|
| *H04N 21/8541* | (2011.01) | |
| *H04N 21/2365* | (2011.01) | |
| *H04N 21/234* | (2011.01) | |

(52) U.S. Cl.
CPC ... *H04N 21/2365* (2013.01); *H04N 21/23424* (2013.01); *H04N 21/8541* (2013.01)

(58) Field of Classification Search
CPC .......... H04N 21/47205; H04N 21/234; H04N 21/23424; H04N 21/2365
See application file for complete search history.

(56) References Cited

U.S. PATENT DOCUMENTS

| | | |
|---|---|---|
| 4,569,026 A | 2/1986 | Best |
| 5,161,034 A | 11/1992 | Klappert |
| 5,568,602 A | 10/1996 | Callahan et al. |
| | (Continued) | |

FOREIGN PATENT DOCUMENTS

| | | |
|---|---|---|
| CA | 2639491 A1 | 3/2010 |
| DE | 004038801 A1 | 6/1992 |
| | (Continued) | |

OTHER PUBLICATIONS

An ffmpeg and SDL Tutorial, "Tutorial 05: Synching Video," Retrieved from internet on Mar. 15, 2013: <http://dranger.com/ffmpeg/tutorial05.html>, 4 pages.

(Continued)

*Primary Examiner* — Brian T Pendleton
*Assistant Examiner* — Frank Johnson
(74) *Attorney, Agent, or Firm* — Goodwin Procter LLP

(57) ABSTRACT

Multiple video streams are simultaneously received, with each stream including a plurality of portions. A video comprising a first portion of a first one of the video streams is presented. Prior to completing the presentation of the first portion, a second portion of the first video stream is appended onto the video. Then, prior to completing the presentation of the second portion, a second video stream is selected based on a user interaction received with respect to the video, and a portion of the second video stream is appended onto the video.

20 Claims, 10 Drawing Sheets

(56) References Cited

U.S. PATENT DOCUMENTS

| | | |
|---|---|---|
| 5,568,603 A | 10/1996 | Chen et al. |
| 5,597,312 A | 1/1997 | Bloom et al. |
| 5,607,356 A | 3/1997 | Schwartz |
| 5,610,653 A | 3/1997 | Abecassis |
| 5,636,036 A | 6/1997 | Ashbey |
| 5,676,551 A | 10/1997 | Knight et al. |
| 5,715,169 A | 2/1998 | Noguchi et al. |
| 5,734,862 A | 3/1998 | Kulas |
| 5,737,527 A | 4/1998 | Shiels et al. |
| 5,745,738 A | 4/1998 | Ricard |
| 5,751,953 A | 5/1998 | Shiels et al. |
| 5,754,770 A | 5/1998 | Shiels et al. |
| 5,818,435 A | 10/1998 | Kozuka et al. |
| 5,848,934 A | 12/1998 | Shiels et al. |
| 5,887,110 A | 3/1999 | Sakamoto et al. |
| 5,894,320 A * | 4/1999 | Vancelette ....... H04N 21/21805 725/138 |
| 5,956,037 A | 9/1999 | Osawa et al. |
| 6,067,400 A | 5/2000 | Saeki et al. |
| 6,122,668 A | 9/2000 | Teng et al. |
| 6,128,712 A | 10/2000 | Hunt et al. |
| 6,191,780 B1 | 2/2001 | Martin et al. |
| 6,222,925 B1 | 4/2001 | Shiels et al. |
| 6,240,555 B1 | 5/2001 | Shoff et al. |
| 6,298,482 B1 | 10/2001 | Seidman et al. |
| 6,460,036 B1 | 10/2002 | Herz |
| 6,535,639 B1 | 3/2003 | Uchihachi et al. |
| 6,657,906 B2 | 12/2003 | Martin |
| 6,698,020 B1 | 2/2004 | Zigmond et al. |
| 6,728,477 B1 | 4/2004 | Watkins |
| 6,771,875 B1 | 8/2004 | Kunieda et al. |
| 6,801,947 B1 | 10/2004 | Li |
| 6,947,966 B1 | 9/2005 | Oko, Jr. et al. |
| 7,085,844 B2 | 8/2006 | Thompson |
| 7,155,676 B2 | 12/2006 | Land et al. |
| 7,231,132 B1 | 6/2007 | Davenport |
| 7,310,784 B1 | 12/2007 | Gottlieb et al. |
| 7,379,653 B2 | 5/2008 | Yap et al. |
| 7,444,069 B1 | 10/2008 | Bernsley |
| 7,472,910 B1 | 1/2009 | Okada et al. |
| 7,627,605 B1 | 12/2009 | Lamere et al. |
| 7,669,128 B2 | 2/2010 | Bailey et al. |
| 7,694,320 B1 | 4/2010 | Yeo et al. |
| 7,779,438 B2 | 8/2010 | Davies |
| 7,787,973 B2 | 8/2010 | Lambert |
| 7,917,505 B2 | 3/2011 | van Gent et al. |
| 8,024,762 B2 | 9/2011 | Britt |
| 8,046,801 B2 | 10/2011 | Ellis et al. |
| 8,065,710 B2 | 11/2011 | Malik |
| 8,151,139 B1 | 4/2012 | Gordon |
| 8,176,425 B2 | 5/2012 | Wallace et al. |
| 8,190,001 B2 | 5/2012 | Bernsley |
| 8,276,058 B2 | 9/2012 | Gottlieb et al. |
| 8,281,355 B1 | 10/2012 | Weaver et al. |
| 8,321,905 B1 * | 11/2012 | Streeter ............ H04N 21/44004 709/231 |
| 8,350,908 B2 | 1/2013 | Morris et al. |
| 8,600,220 B2 | 12/2013 | Bloch et al. |
| 8,612,517 B1 * | 12/2013 | Yadid ............... H04N 21/25891 709/201 |
| 8,650,489 B1 | 2/2014 | Baum et al. |
| 8,750,682 B1 | 6/2014 | Nicksay et al. |
| 8,826,337 B2 | 9/2014 | Issa et al. |
| 8,860,882 B2 | 10/2014 | Bloch et al. |
| 8,930,975 B2 | 1/2015 | Woods et al. |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,082,092 B1 | 7/2015 | Henry |
| 9,094,718 B2 | 7/2015 | Barton et al. |
| 9,190,110 B2 | 11/2015 | Bloch |
| 9,257,148 B2 | 2/2016 | Bloch et al. |
| 9,268,774 B2 | 2/2016 | Kim et al. |
| 9,271,015 B2 | 2/2016 | Bloch et al. |
| 9,363,464 B2 | 6/2016 | Alexander |
| 9,367,196 B1 | 6/2016 | Goldstein et al. |
| 9,390,099 B1 | 7/2016 | Wang et al. |
| 9,456,247 B1 | 9/2016 | Pontual et al. |
| 9,465,435 B1 | 10/2016 | Zhang et al. |
| 9,473,582 B1 | 10/2016 | Fraccaroli |
| 9,510,044 B1 | 11/2016 | Pereira et al. |
| 9,520,155 B2 | 12/2016 | Bloch et al. |
| 9,530,454 B2 | 12/2016 | Bloch et al. |
| 9,538,219 B2 | 1/2017 | Sakata et al. |
| 9,571,877 B2 | 2/2017 | Lee et al. |
| 9,607,655 B2 | 3/2017 | Bloch et al. |
| 9,641,898 B2 | 5/2017 | Bloch et al. |
| 9,653,115 B2 | 5/2017 | Bloch et al. |
| 9,653,116 B2 | 5/2017 | Paulraj et al. |
| 9,672,868 B2 | 6/2017 | Bloch et al. |
| 9,715,901 B1 | 7/2017 | Singh et al. |
| 9,736,503 B1 | 8/2017 | Bakshi et al. |
| 9,792,026 B2 | 10/2017 | Bloch et al. |
| 9,792,957 B2 | 10/2017 | Bloch et al. |
| 9,826,285 B1 | 11/2017 | Mishra et al. |
| 9,967,621 B2 | 5/2018 | Armstrong et al. |
| 10,178,304 B1 | 1/2019 | Tudor et al. |
| 10,178,421 B2 | 1/2019 | Thomas et al. |
| 10,257,572 B2 | 4/2019 | Manus et al. |
| 10,419,790 B2 | 9/2019 | Gersten |
| 10,460,765 B2 | 10/2019 | Bloch et al. |
| 10,523,982 B2 | 12/2019 | Oyman |
| 2001/0056427 A1 | 12/2001 | Yoon et al. |
| 2002/0019799 A1 | 2/2002 | Ginsberg et al. |
| 2002/0053089 A1 * | 5/2002 | Massey .................. A63F 13/10 725/135 |
| 2002/0086724 A1 | 7/2002 | Miyaki et al. |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0124250 A1 | 9/2002 | Proehl et al. |
| 2002/0129374 A1 * | 9/2002 | Freeman ................ H04H 20/12 725/91 |
| 2002/0140719 A1 * | 10/2002 | Amir .................. G06F 17/30017 715/716 |
| 2002/0144262 A1 | 10/2002 | Plotnick et al. |
| 2002/0174430 A1 | 11/2002 | Ellis et al. |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0012409 A1 | 1/2003 | Overton et al. |
| 2003/0020744 A1 | 1/2003 | Ellis et al. |
| 2003/0023757 A1 | 1/2003 | Ishioka et al. |
| 2003/0039471 A1 * | 2/2003 | Hashimoto .......... H04N 9/8227 386/210 |
| 2003/0076347 A1 | 4/2003 | Barrett et al. |
| 2003/0101164 A1 | 5/2003 | Pic et al. |
| 2003/0148806 A1 | 8/2003 | Weiss |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0009813 A1 | 1/2004 | Wind |
| 2004/0019905 A1 | 1/2004 | Fellenstein et al. |
| 2004/0034711 A1 | 2/2004 | Hughes |
| 2004/0091848 A1 | 5/2004 | Nemitz |
| 2004/0125124 A1 | 7/2004 | Kim et al. |
| 2004/0128317 A1 | 7/2004 | Sull et al. |
| 2004/0138948 A1 | 7/2004 | Loomis |
| 2004/0146275 A1 * | 7/2004 | Takata ................. G11B 27/034 386/286 |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2004/0199923 A1 | 10/2004 | Russek |
| 2004/0261127 A1 * | 12/2004 | Freeman .................. G03C 1/26 725/135 |
| 2005/0019015 A1 | 1/2005 | Ackley et al. |
| 2005/0028193 A1 * | 2/2005 | Candelore ........ H04N 21/23608 725/135 |
| 2005/0055377 A1 | 3/2005 | Dorey et al. |
| 2005/0091597 A1 | 4/2005 | Ackley |
| 2005/0102707 A1 | 5/2005 | Schnitman |

(56) References Cited

U.S. PATENT DOCUMENTS

| | | |
|---|---|---|
| 2005/0107159 A1 | 5/2005 | Sato |
| 2005/0120389 A1* | 6/2005 | Boss ............... G06Q 30/02 |
| | | 725/135 |
| 2005/0132401 A1 | 6/2005 | Boccon-Gibod et al. |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0251820 A1 | 11/2005 | Stefanik et al. |
| 2005/0251827 A1 | 11/2005 | Ellis et al. |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0130121 A1* | 6/2006 | Candelore ............ H04N 21/458 |
| | | 725/145 |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0200842 A1 | 9/2006 | Chapman et al. |
| 2006/0222322 A1 | 10/2006 | Levitan |
| 2006/0224260 A1 | 10/2006 | Hicken et al. |
| 2006/0274828 A1* | 12/2006 | Siemens ............. G07C 5/0891 |
| | | 375/240.01 |
| 2007/0003149 A1 | 1/2007 | Nagumo et al. |
| 2007/0024706 A1 | 2/2007 | Brannon et al. |
| 2007/0033633 A1* | 2/2007 | Andrews .......... H04N 21/23418 |
| | | 725/135 |
| 2007/0055989 A1 | 3/2007 | Shanks et al. |
| 2007/0079325 A1 | 4/2007 | de Heer |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1 | 7/2007 | Ben-Yaacov et al. |
| 2007/0220583 A1 | 9/2007 | Bailey et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0019445 A1 | 1/2008 | Aono et al. |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0148152 A1 | 6/2008 | Blinnikka et al. |
| 2008/0161111 A1 | 7/2008 | Schuman |
| 2008/0170687 A1 | 7/2008 | Moors et al. |
| 2008/0177893 A1 | 7/2008 | Bowra et al. |
| 2008/0178232 A1* | 7/2008 | Velusamy ......... H04N 5/23203 |
| | | 725/88 |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0077137 A1 | 3/2009 | Weda et al. |
| 2009/0079663 A1 | 3/2009 | Chang et al. |
| 2009/0083631 A1 | 3/2009 | Sidi et al. |
| 2009/0116817 A1 | 5/2009 | Kim et al. |
| 2009/0177538 A1 | 7/2009 | Brewer et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0226046 A1 | 9/2009 | Shteyn |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265746 A1* | 10/2009 | Halen ............... H04L 29/06027 |
| | | 725/109 |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0077290 A1 | 3/2010 | Pueyo |
| 2010/0088726 A1 | 4/2010 | Curtis et al. |
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293455 A1 | 11/2010 | Bloch |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0069940 A1 | 3/2011 | Shimy et al. |
| 2011/0078023 A1 | 3/2011 | Audrey et al. |
| 2011/0078740 A1 | 3/2011 | Bouyukh et al. |
| 2011/0096225 A1 | 4/2011 | Candelore |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0246885 A1 | 10/2011 | Pantos et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0017141 A1 | 1/2012 | Eelen et al. |
| 2012/0062576 A1 | 3/2012 | Rosenthal et al. |
| 2012/0081389 A1 | 4/2012 | Dilts |
| 2012/0089911 A1 | 4/2012 | Hosking et al. |
| 2012/0094768 A1 | 4/2012 | McCaddon et al. |
| 2012/0105723 A1 | 5/2012 | van Coppenolle et al. |
| 2012/0110618 A1 | 5/2012 | Kilar et al. |

(56) References Cited

U.S. PATENT DOCUMENTS

| | | |
|---|---|---|
| 2012/0110620 A1 | 5/2012 | Kilar et al. |
| 2012/0120114 A1 | 5/2012 | You et al. |
| 2012/0134646 A1 | 5/2012 | Alexander |
| 2012/0147954 A1 | 6/2012 | Kasai et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0213495 A1 | 8/2012 | Hafeneger et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1 | 1/2013 | Johnson et al. |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0039632 A1* | 2/2013 | Feinson ............... H04N 9/8211 386/223 |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0094830 A1* | 4/2013 | Stone ..................... H04N 5/775 386/230 |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0173765 A1 | 7/2013 | Korbecki |
| 2013/0177294 A1* | 7/2013 | Kennberg ........... H04N 13/0282 386/241 |
| 2013/0188923 A1* | 7/2013 | Hartley .................... H04N 9/87 386/241 |
| 2013/0195427 A1* | 8/2013 | Sathish ............... H04N 21/8541 386/E9.011 |
| 2013/0202265 A1 | 8/2013 | Arrasvuori et al. |
| 2013/0204710 A1 | 8/2013 | Boland et al. |
| 2013/0219425 A1 | 8/2013 | Swartz |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0282917 A1* | 10/2013 | Reznik ............... H04N 21/4402 709/231 |
| 2013/0290818 A1 | 10/2013 | Arrasvuori et al. |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0314239 A1 | 10/2014 | Meyer et al. |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1 | 3/2015 | Brown et al. |
| 2015/0067723 A1 | 3/2015 | Bloch et al. |
| 2015/0070458 A1 | 3/2015 | Kim et al. |
| 2015/0104155 A1 | 4/2015 | Bloch et al. |
| 2015/0124171 A1 | 5/2015 | King |
| 2015/0154439 A1 | 6/2015 | Anzue et al. |
| 2015/0160853 A1 | 6/2015 | Hwang et al. |
| 2015/0179224 A1 | 6/2015 | Bloch et al. |
| 2015/0181271 A1 | 6/2015 | Onno et al. |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0256861 A1 | 9/2015 | Oyman |
| 2015/0258454 A1 | 9/2015 | King et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2016/0021412 A1 | 1/2016 | Zito, Jr. |
| 2016/0037217 A1 | 2/2016 | Harmon et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1 | 3/2016 | Gaidar et al. |
| 2016/0094875 A1 | 3/2016 | Peterson et al. |
| 2016/0100226 A1 | 4/2016 | Sadler et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0142889 A1 | 5/2016 | O'Connor et al. |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0277779 A1 | 9/2016 | Zhang et al. |
| 2016/0303608 A1 | 10/2016 | Jossick |
| 2016/0322054 A1 | 11/2016 | Bloch et al. |
| 2016/0323608 A1 | 11/2016 | Bloch et al. |
| 2016/0365117 A1 | 12/2016 | Boliek et al. |
| 2016/0366454 A1 | 12/2016 | Tatourian et al. |
| 2017/0006322 A1 | 1/2017 | Dury et al. |
| 2017/0062012 A1 | 3/2017 | Bloch et al. |
| 2017/0142486 A1 | 5/2017 | Masuda |
| 2017/0178409 A1 | 6/2017 | Bloch et al. |
| 2017/0178601 A1 | 6/2017 | Bloch et al. |
| 2017/0195736 A1 | 7/2017 | Chai et al. |
| 2017/0264920 A1 | 9/2017 | Mickelsen |
| 2017/0289220 A1 | 10/2017 | Bloch et al. |
| 2017/0295410 A1 | 10/2017 | Bloch et al. |
| 2017/0345460 A1 | 11/2017 | Bloch et al. |
| 2018/0007443 A1 | 1/2018 | Cannistraro et al. |
| 2018/0014049 A1 | 1/2018 | Griffin et al. |
| 2018/0025078 A1 | 1/2018 | Quennesson |
| 2018/0068019 A1 | 3/2018 | Novikoff et al. |
| 2018/0130501 A1 | 5/2018 | Bloch et al. |
| 2018/0176573 A1 | 6/2018 | Chawla et al. |
| 2018/0191574 A1 | 7/2018 | Vishnia et al. |
| 2018/0254067 A1 | 9/2018 | Elder |

(56) References Cited

U.S. PATENT DOCUMENTS

| | | | |
|---|---|---|---|
| 2018/0262798 | A1 | 9/2018 | Ramachandra |
| 2019/0075367 | A1 | 3/2019 | van Zessen et al. |
| 2019/0090002 | A1 | 3/2019 | Ramadorai et al. |

FOREIGN PATENT DOCUMENTS

| | | | |
|---|---|---|---|
| DE | 10053720 A1 | 4/2002 | |
| EM | 1033157 A2 | 9/2000 | |
| EP | 0965371 A2 | 12/1999 | |
| EP | 1033157 A2 | 9/2000 | |
| EP | 2104105 A1 | 9/2009 | |
| GB | 2359916 A | 9/2001 | |
| GB | 2428329 A | 1/2007 | |
| JP | 2008005288 A | 1/2008 | |
| KR | 2004-0005068 A | 1/2004 | |
| KR | 20040005068 A | 1/2004 | |
| KR | 2010-0037413 A | 4/2010 | |
| WO | WO-1996/013810 A1 | 5/1996 | |
| WO | WO-2000/059224 A1 | 10/2000 | |
| WO | WO-2007/062223 A2 | 5/2007 | |
| WO | WO-2007/138546 A2 | 12/2007 | |
| WO | WO-2008/001350 A2 | 1/2008 | |
| WO | WO-2008/052009 A2 | 5/2008 | |
| WO | WO-2008/057444 A2 | 5/2008 | |
| WO | WO-2009/125404 A2 | 10/2009 | |
| WO | WO-2009/137919 | 11/2009 | |
| WO | WO-2009/137919 A1 | 11/2009 | |

OTHER PUBLICATIONS

Archos Gen 5 English User Manual Version 3.0, Jul. 26, 2007, pp. 1-81.
Barlett, Mitch, "iTunes 11: How to Queue Next Song," Technipages, Oct. 6, 2008, pp. 1-8, retrieved on Dec. 26, 2013 from the internet: http://www.technipages.com/itunes-queue-next-song.html.
Gregor Miller et al. "MiniDiver: A Novel Mobile Media Playback Interface for Rich Video Content on an IPhoneTM", Entertainment Computing A ICEC 2009, Sep. 3, 2009, pp. 98-109.
International Search Report for International Patent Application PCT/IL2010/000362 dated Aug. 25, 2010, 2 pages.
International Search Report for International Patent Application PCT/IL2012/000080 dated Aug. 9, 2012, 4 pages.
International Search Report for International Patent Application PCT/IL2012/000081 dated Jun. 28, 2012, 4 pages.
International Search Report and Written Opinion for International Application PCT/IB2013/001000 dated Jul. 31, 2013, 12 pages.
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, pp. 1-8.
Sodagar, I., (2011) "The MPEG-DASH Standard for Multimedia Streaming Over the Internet", *IEEE Multimedia*, IEEE Service Center, New York, NY, US, vol. 18, No. 4, pp. 62-67.
Supplemental European Search Report for EP10774637.2 (PCT/IL2010/000362) dated Jun. 20, 2012, 6 pages.
Supplemental European Search Report for EP13184145 dated Jan. 30, 2014, 6 pages.
Yang, H, et al., "Time Stamp Synchronization in Video Systems," Teletronics Technology Corporation, <http://www.ttcdas.com/products/dausencoders/pdf/techpapers/tp2010timestampvideosystem.pdf>, Abstract, 8 pages.
ITunes 11: How to Queue Next Song, Published Oct. 6, 2008, pp. 1-8.
Miller, Gregor et al., (Sep. 3, 2009) "MiniDiver: A Novel Mobile Media Playback Interface for Rich Video Content on an IPhoneTM", *Entertainment Computing A ICEC 2009*, pp. 98-109.
U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.
U.S. Appl. No. 16/986,977, Systems and Methods for Creating Linear Video From Branched Video, filed Aug. 6, 2020.
U.S. Appl. No. 16/865,896, Systems and Methods for Dynamic Video Bookmarking, filed May 4, 2020.
U.S. Appl. No. 16/800,994, Systems and Methods for Adaptive and Responsive Video, filed Feb. 25, 2020.
U.S. Appl. No. 15/997,284 Published as US2019/0373330, Interactive Video Dynamic Adaptation and User Profiling, filed Jun. 4, 2018.
U.S. Appl. No. 16/283,066 Published as US2019/0349637, Dynamic Library Display for Interactive Videos, filed Feb. 22, 2019.
U.S. Appl. No. 17/091,149, Dynamic Library Display for Interactive Videos, filed Nov. 6, 2020.
U.S. Appl. No. 16/793,201, Systems and Methods for Detecting Anomalous Activities for Interactive Videos, filed Feb. 18, 2020.
U.S. Appl. No. 16/922,540, Systems and Methods for Seamless Audio and Video Endpoint Transitions, filed Jul. 7, 2020.
U.S. Appl. No. 12/706,721 U.S. Pat. No. 9,190,110 Published as US2010/0293455, System and Method for Assembling a Recorded Composition, filed Feb. 17, 2010.
U.S. Appl. No. 14/884,285 Published as US2017/0178601, Systems and Method for Assembling a Recorded Composition, filed Oct. 15, 2015.
U.S. Appl. No. 13/033,916 U.S. Pat. No. 9,607,655 Published as US2011/0200116, System and Method for Seamless Multimedia Assembly, filed Feb. 24, 2011.
U.S. Appl. No. 13/034,645 Published as US2011/0202562, System and Method for Data Mining Within Interactive Multimedia, filed Feb. 24, 2011.
U.S. Appl. No. 13/437,164 U.S. Pat. No. 8,600,220 Published as US2013/0259442, Systems and Methods for Loading More Than One Video Content at a Time, filed Apr. 2, 2012.
U.S. Appl. No. 14/069,694 U.S. Pat. No. 9,271,015 Published as US2014/0178051, Systems and Methods for Loading More Than One Video Content at a Time, filed Nov. 1, 2013.
U.S. Appl. No. 13/622,780 U.S. Pat. No. 8,860,882 Published as US2014/0078397, Systems and Methods for Constructing Multimedia Content Modules, filed Sep. 19, 2012.
U.S. Appl. No. 13/622,795 U.S. Pat. No. 9,009,619 Published as US2014/0082666, Progress Bar for Branched Videos, filed Sep. 19, 2012.
U.S. Appl. No. 14/639,579 U.S. Pat. No. 10,474,334 Published as US2015/0199116, Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821 U.S. Pat. No. 10,418,066 Published as US2016/0217829, System and Method for Synchronization of Selectably Presentable Media Streams, filed Dec. 30, 2015.
U.S. Appl. No. 13/921,536 U.S. Pat. No. 9,832,516 Published as US2014/0381067, Systems and Methods for Multiple Device Interaction with Selectably Presentable Media Streams, filed Jun. 19, 2013.
U.S. Appl. No. 14/107,600 U.S. Pat. No. 10,448,119 Published as US2015/0067723, Methods and Systems for Unfolding Video Pre-Roll, filed Dec. 16, 2013.
U.S. Appl. No. 14/335,381 U.S. Pat. No. 9,530,454 Published as US2015/0104155, Systems and Methods for Real-Time Pixel Switching, filed Jul. 18, 2014.
U.S. Appl. No. 15/356,913, Systems and Methods for Real-Time Pixel Switching, filed Nov. 21, 2016.
U.S. Appl. No. 14/139,996 U.S. Pat. No. 9,641,898 Published as US2015/0181301, Methods and Systems for In-Video Library, filed Dec. 24, 2013.
U.S. Appl. No. 14/140,007 U.S. Pat. No. 9,520,155 Published as US2015/0179224, Methods and Sysems for Seeking to Non-Key Frames, filed Dec. 24, 2013.
U.S. Appl. No. 14/249,627 U.S. Pat. No. 9,653,115 Published as US 2015-0294685, Systems and Methods for Creating Linear Video From Branched Video, filed Apr. 10, 2014.

(56) References Cited

OTHER PUBLICATIONS

U.S. Appl. No. 15/481,916 Published as US 2017-0345460, Systems and Methods for Creating Linear Video From Branched Video, filed Apr. 7, 2017.
U.S. Appl. No. 14/249,665 U.S. Pat. No. 9,792,026 Published as US2015/0293675, Dynamic Timeline for Branched Video, filed Apr. 10, 2014.
U.S. Appl. No. 14/509,700 U.S. Pat. No. 9,792,957 Published as US2016/0104513, Systems and Methods for Dynamic Video Bookmarking, filed Oct. 8, 2014.
U.S. Appl. No. 14/534,626 Published as US-2018-0130501-A1, Systems and Methods for Dynamic Video Bookmarking, filed Sep. 13, 2017.
U.S. Appl. No. 14/700,845 U.S. Pat.No. 10,582,265 Published as US2016/0323608, Systems and Methods for Nonlinear Video Playback Using Linear Real-Time Video Players, filed Apr. 30, 2015.
U.S. Appl. No. 16/752,193, Systems and Methods for Nonlinear Video Playback Using Linear Real-Time Video Players, filed Jan. 24, 2020.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 U.S. Pat No. 10,460,765 Published as US2017/0062012, Systems and Methods for Adaptive and Responsive Video, filed Aug. 26, 2015.
U.S. Appl. No. 16/559,082 Published as US2019/0392868, Systems and Methods for Adaptive and Responsive Video, filed Sep. 3, 2019.
U.S. Appl. No. 14/978,464 Published as US2017/0178601, Intelligent Buffering of Large-Scale Video, filed Dec. 22, 2015.
U.S. Appl. No. 14/978,491 Published as US2017/0178409, Seamless Transitions in Large-Scale Video, filed Dec. 22, 2015.
U.S. Appl. No. 15/085,209 U.S. Pat. No. 10,462,202 Published as US2017/0289220, Media Stream Rate Synchronization, filed Mar. 30, 2016.
U.S. Appl. No. 15/165,373 Published as US 2017-0295410, Symbiotic Interactive Video, filed May 26, 2016.
U.S. Appl. No. 15/189,931 U.S. Pat. No. 10,218,760 Published as US2017/0374120, Dynamic Summary Generation for Real-time Switchable Videos, filed Jun. 22, 2016.
U.S. Appl. No. 15/395,477 Published as US2018/0191574, Systems and Methods for Dynamic Weighting of Branched Video Paths, filed Dec. 30, 2016.
U.S. Appl. No. 15/997,284, Interactive Video Dynamic Adaptation and User Profiling, filed Jun 4, 2018.
U.S. Appl. No. 15/863,191 U.S. Pat. No. 10,257,578, Dynamic Library Display for Interactive Videos, filed Jan. 5, 2018.
U.S. Appl. No. 16/283,066, Dynamic Library Display for Interactive Videos, filed Feb. 22, 2019.
U.S. Appl. No. 16/591,103, Systems and Methods for Dynamically Adjusting Video Aspect Ratios, filed Oct. 2, 2019.
U.S. Appl. No. 16/793,205, Dynamic Adaptation of Interactive Video Players Using Behavioral Analytics, filed Feb. 18, 2020.
U.S. Appl. No. 16/793,201, System and Methods for Detecting Anomalous Activities for Interactive Videos, filed Feb. 18, 2020.
U.S. Appl. No. 12/706,721, now U.S. Pat. No. 9,190,110, the Office Actions dated Apr. 26, 2012, Aug. 17, 2012, Mar. 28, 13, Jun. 20, 2013, Jan. 3, 2014, Jul. 7, 2014, and Dec. 19, 2014; the Notices of Allowance dated Jun. 19, 2015, Jul. 17, 2015, Jul. 29, 2015, Aug. 12, 2015, and Sep. 14, 2015.
U.S. Appl. No. 14/884,284, the Office Actions dated Sep. 8, 2017; May 18, 2018; Dec. 14, 2018; Jul. 25, 2019; Nov. 18, 2019 and Feb. 21, 2020.
U.S. Appl. No. 13/033,916, now U.S. Pat. No. 9,607,655, the Office Actions dated Jun. 7, 2013, Jan. 2, 2014, Aug. 28, 2014, Jan. 5, 2015, Jul. 9, 2015, and Jan. 5, 2016; the Advisory Action dated May 11, 2016; and the Notice of Allowance dated Dec. 21, 2016.
U.S. Appl. No. 13/034,645, the Office Actions dated Jul. 23, 2012, Mar. 21, 2013, Sep. 15, 2014, Jun. 4, 2015, Apr. 7, 2017, Oct. 6, 2017, Aug. 10, 2018, Jul. 5, 2016, Apr. 5, 2019 and Dec. 26, 2019.

U.S. Appl. No. 13/437,164, now U.S. Pat. No. 8,600,220, the Notice of Allowance dated Aug. 9, 2013.
U.S. Appl. No. 14/069,694, now U.S. Pat. No. 9,271,015, the Office Actions dated Apr. 27, 2015 and Aug. 31, 2015, the Notice of Allowance dated Oct. 13, 2015.
U.S. Appl. No. 13/622,780, now U.S. Pat. No. 8,860,882, the Office Action dated Jan. 16, 2014, the Notice of Allowance dated Aug. 4, 2014.
U.S. Appl. No. 13/622,795, now U.S. Pat. No. 9,009,619, the Office Actions dated May 23, 2014 and Dec. 1, 2014, the Notice of Allowance dated Jan. 9, 2015.
U.S. Appl. No. 14/639,579, the Office Actions dated May 3, 2017, Nov. 22, 2017 and Jun. 26, 2018, the Notice of Allowance dated Feb. 8, 2019 and Jul. 11, 2019.
U.S. Appl. No. 13/838,830, now U.S. Pat. No. 9,257,148, the Office Action dated May 7, 2015, Notices of Allowance dated Nov. 6, 2015.
U.S. Appl. No. 14/984,821, now U.S. Pat. No. 10,418,066, the Office Actions dated Jun. 1, 2017, Dec. 6, 2017, and Oct. 5, 2018; the Notice of Allowance dated May 7, 2019.
U.S. Appl. No. 13/921,536, now U.S. Pat. No. 9,832,516, the Office Actions dated Feb. 25, 2015, Oct. 20, 2015, Aug. 26, 2016 and Mar. 8, 2017, the Advisory Action dated Jun. 21, 2017, and Notice of Allowance dated Sep. 12, 2017.
U.S. Appl. No. 14/107,600, now U.S. Pat. No. 10,448,119, the Office Actions dated Dec. 19, 2014, Jul. 8, 2015, Jun. 3, 2016, Mar. 8, 2017, Oct. 10, 2017 and Jul. 25, 2018, Notices of Allowance dated Dec. 31, 2018 and Apr. 25, 2019.
U.S. Appl. No. 14/335,381, now U.S. Pat. No. 9,530,454, the Office Action dated Feb. 12, 2016; and the Notice of Allowance dated Aug. 24, 2016.
U.S. Appl. No. 14/139,996, now U.S. Pat. No. 9,641,898, the Office Actions dated Jun. 18, 2015, Feb. 3, 2016 and May 4, 2016; and the Notice of Allowance dated Dec. 23, 2016.
U.S. Appl. No. 14/140,007, now U.S. Pat. No. 9,520,155, the Office Actions dated Sep. 8, 2015 and Apr. 26, 2016; and the Notice of Allowance dated Oct. 11, 2016.
U.S. Appl. No. 14/249,627, now U.S. Pat. No. 9,653,115, the Office Actions dated Jan. 14, 2016 and Aug. 9, 2016; and the Notice of Allowance dated Jan. 13, 2017.
U.S. Appl. No. 15/481,916, the Office Actions dated Oct. 6, 2017, Aug. 6, 2018, Mar. 8, 2019, Nov. 27, 2019; and the Notice of Allowance dated Apr. 21, 2020.
U.S. Appl. No. 14/249,665, now U.S. Pat. No. 9,792,026, the Office Actions dated May 16, 2016 and Feb. 22, 2017; and the Notices of Allowance dated Jun. 2, 2017 and Jul. 24, 2017.
U.S. Appl. No. 14/509,700, now U.S. Pat. No. 9,792,957, the Office Action dated Oct. 28, 2016; and the Notice of Allowance dated Jun. 15, 2017.
U.S. Appl. No. 15/703,462, the Office Action dated Jun. 21, 2019, and Dec. 27, 2019; and the Notice of Allowance dated Feb. 10, 2020.
U.S. Appl. No. 14/700,845, now U.S. Pat. No. 9,653,115, the Office Actions dated May 20, 2016, Dec. 2, 2016, May 22, 2017, Nov. 28, 2017, Jun. 27, 2018 and Feb. 19, 2019 and the Notice of Allowance dated Oct. 21, 2019.
U.S. Appl. No. 14/700,862, now U.S. Pat. No. 9,672,868, the Office Action dated Aug. 26, 2016; and the Notice of Allowance dated Mar. 9, 2017.
U.S. Appl. No. 14/835,857, now U.S. Pat. No. 10,460,765, the Office Actions dated Sep. 23, 2016, Jun. 5, 2017 and Aug. 9, 2018, and the Advisory Action dated Oct. 20, 2017; Notice of Allowances dated Feb. 25, 2019 and Jun. 7, 2019.
U.S. Appl. No. 14/978,464, the Office Actions dated Jul. 25, 2019 Dec. 14, 2018, May 18, 2018, and Sep. 8, 2017.
U.S. Appl. No. 16/559,082, the Office Actions dated Feb. 20, 2020; the Notice of Allowance dated Feb. 20, 2020.
U.S. Appl. No. 14/978,491, the Office Actions dated Sep. 8, 2017, May 25, 2018, Dec. 14, 2018, Aug. 12, 2019 and Dec. 23, 2019.
U.S. Appl. No. 15/085,209, now U.S. Pat. No. 10,462,202, the Office Actions dated Feb. 26, 2018 and Dec. 31, 2018; the Notice of Allowance dated Aug. 12, 2019.

(56) References Cited

OTHER PUBLICATIONS

U.S. Appl. No. 15/165,373, the Office Actions dated Mar. 24, 2017, Oct. 11, 2017, May 18, 2018; Feb. 1, 2019, Aug. 8, 2019, and Jan. 3, 2020.
U.S. Appl. No. 15/189,931, now U.S. Pat. No. 10,218,760, the Office Actions dated Apr. 6, 2018, Notice of Allowance dated Oct. 24, 2018.
U.S. Appl. No. 15/395,477, the Office Actions dated Nov. 2, 2018, and Aug. 16, 2019.
U.S. Appl. No. 15/997,284, the Office Actions dated Aug. 11, 2019 and Nov. 21, 2019.
U.S. Appl. No. 15/863,191, now U.S. Pat. No. U.S. Appl. No. 10/257,578, Notices of Allowance dated Jul. 5, 2018 and Nov. 23, 2018.
U.S. Appl. No. 16/283,066, the Office Action dated Jan. 6, 2020.
U.S. Appl. No. 14/884,285 Published as US2016/0170948, System and Method for Assembling a Recorded Composition, filed Oct. 15, 2015.
U.S. Appl. No. 14/639,579 Published as US2015/0199116, Progress Bar for Branched Videos, filed Mar. 5, 2015.
U.S. Appl. No. 14/984,821 Published as US2016/0217829, System and Method for Synchronization of Selectably Presentable Media Streams, filed Dec. 30, 2015.
U.S. Appl. No. 13/921,536 Published as US2014/0380167, Systems and Methods for Multiple Device Interaction with Selectably Presentable Media Streams, filed Jun. 19, 2013.
U.S. Appl. No. 14/107,600 Published as US2015/0067723, Methods and Systems for Unfolding Video Pre-Roll, filed Dec. 16, 2013.
U.S. Appl. No. 15/356,913 Abandoned, Systems and Methods for Real-Time Pixel Switching, filed Nov. 21, 2016.
U.S. Appl. No. 14/140,007 U.S. Pat. No. 9,520,155 Published as US2015/0179224, Methods and Systems for Seeking to Non-Key Frames, filed Dec. 24, 2013.
U.S. Appl. No. 15/481,916, Systems and Methods for Creating Linear Video From Branched Video, filed Apr. 7, 2017.
U.S. Appl. No. 15/703,462, Systems and Methods for Dynamic Video Bookmarking, filed Sep. 13, 2017.
U.S. Appl. No. 14/534,626 Published as US2016/0105724, Systems and Methods for Parallel Track Transitions, filed Nov. 6, 2014.
U.S. Appl. No. 14/700,845 Published as US2016/0323608, Systems and Methods for Nonlinear Video Playback Using Linear Real-Time Video Players, filed Apr. 30, 2015.
U.S. Appl. No. 14/835,857 Published as US2017/0062012, Systems and Methods for Adaptive and Responsive Video, filed Aug. 26, 2015.
U.S. Appl. No. 15/085,209 Published as US2017/0289220, Media Stream Rate Synchronization, filed Mar. 30, 2016.
U.S. Appl. No. 15/189,931, Dynamic Summary Generation for Real-time Switchable Videos, filed Jun. 22, 2016.
U.S. Appl. No. 15/395,477, Systems and Methods for Dynamic Weighting of Branched Video Paths, filed Dec. 30, 2016.
U.S. Appl. No. 12/706,721, now U.S. Pat. No. 9,190,110, the Office Actions dated Apr. 26, 2012, Aug. 17, 2012, Mar. 28, 2013, Jun. 20, 2013, Jan. 3, 2014, Jul. 7, 2014, and Dec. 19, 2014; the Notices of Allowance dated Jun. 19, 2015 and Jul. 17, 2015; the Notices of Allowance dated Jul. 29, 2015, Aug. 12, 2015 and Sep. 14, 2015.
U.S. Appl. No. 14/069,694, the Office Action dated Oct. 5, 2017.
U.S. Appl. No. 13/034,645, the Office Actions dated Jul. 23, 2012, Mar. 21, 2013, Sep. 15, 2014, Jun. 4, 2015, Apr. 7, 2017 and Oct. 6, 2017.
U.S. Appl. No. 14/639,579, the Office Action dated May 3, 2017.
U.S. Appl. No. 13/838,830, now U.S. Pat. No. 9,257,148, the Office Action dated May 7, 2015, the Notice of Allowance dated Nov. 6, 2015.
U.S. Appl. No. 14/984,821, the Office Action dated Jun. 1, 2017.
U.S. Appl. No. 13/921,536, the Office Actions dated Feb. 25, 2015, Oct. 20, 2015, Aug. 26, 2016 and Mar. 8, 2017; the Advisory Action dated Jun. 21, 2017, and the Notice of Allowance dated Sep. 12, 2017.
U.S. Appl. No. 14/107,600, the Office Actions dated Dec. 19, 2014, Jul. 8, 2015, Jun. 3, 2016, Mar. 8, 2017 and Oct. 10, 2017; and the Advisory Action dated Jul. 11, 2017.
U.S. Appl. No. 15/481,916, the Office Action dated Oct. 6, 2017.
U.S. Appl. No. 14/249,665, the Office Actions dated May 16, 2016 and Feb. 22, 2017; and the Notices of Allowance dated Jun. 2, 2017 and Jul. 24, 2017.
U.S. Appl. No. 14/509,700, the Office Action dated Oct. 28, 2016; and the Notice of Allowance dated Jun. 15, 2017.
U.S. Appl. No. 14/534,626, the Office Actions dated Nov. 25, 2015, Jul. 5, 2016 and Jun. 5, 2017.
U.S. Appl. No. 14/700,845, the Office Actions dated May 20, 2016, Dec. 2, 2016 and May 22, 2017; and the Advisory Action dated Apr. 12, 2017.
U.S. Appl. No. 14/835,857, the Office Actions dated Sep. 23, 2016 and Jun. 5, 2017; and the Advisory Action dated Oct. 20, 2017.
U.S. Appl. No. 14/978,464, the Office Action dated Sep. 8, 2017.
U.S. Appl. No. 14/978,491, the Office Action dated Sep. 8, 2017.
U.S. Appl. No. 15/165,373, the Office Actions dated Mar. 24, 2017 and Oct. 11, 2017.

\* cited by examiner

SYSTEMS AND METHODS FOR PARALLEL TRACK TRANSITIONS

CROSS-REFERENCE TO RELATED APPLICATION

This application claims priority to and the benefit of U.S. Provisional Patent Application No. 62/062,435, filed on Oct. 10, 2014, and entitled "Systems and Methods for Parallel Track Transitions," the entirety of which is incorporated by reference herein.

FIELD OF THE INVENTION

The present disclosure relates generally to parallel video streaming and, more particularly, to systems and methods for providing real-time transitions among simultaneously provided video streams.

BACKGROUND

Over the past decade there has been an exponential growth in the prevalence of streaming media in the lives of the general public. Users frequently listen to streaming music on Internet radio stations such as Pandora, and watch streaming television shows, movies, and video clips on websites such as Hulu, Netflix, and YouTube. Interactive streaming media also exists; for example, current forms of such media allow a viewer to make choices on how to proceed through predefined audio/video paths. This functionality is accomplished, however, using separate media segments that are jumped to upon selection, resulting in a noticeable disconnect in audio and video between consecutive segments. Further, users are generally limited in how they can switch among various media segments without causing such disconnects.

SUMMARY

Systems and methods for providing parallel tracks and transitions therebetween are described. In one aspect, multiple video streams, each including multiple portions, are received simultaneously, and a video is presented that includes a portion of a first video stream. Prior to concluding playback of the video portion, a second portion is appended to the presentation. Then, prior to the conclusion of the second portion, a user interaction is received and a second stream is selected based thereon. A first transition video is presented after the second portion of the first video stream based on the first and/or second video streams, and a portion of the second video stream is appended to the video.

In one implementation, the length of a particular video stream portion is about one second or less. The first and second portions of the first video stream can be consecutive. Further, the video streams, or tracks, can adhere to a common timeline. Thus, the second portion of the first video stream and the portion of the second video stream can be consecutive with respect to the common timeline.

In another implementation, a third video streams is composed of a plurality of transition videos from which the first transition video is selected. The first transition video can be selected by identifying a transition video that begins subsequent to the time that the user interaction was received with respect to a common timeline shared by the streams.

In a further implementation, a second transition video is presented between the first transition video and the portion of the second video stream. In the foregoing case, the first transition video is associated with the first video stream and the second transition video is associated with the second video stream.

In yet another implementation, the first video stream includes a first version of the first video stream (e.g., a high quality version), and the other video streams each include a second, different version (e.g., a low quality version) of their respective video streams. After receiving the user interaction, a user application can begin receiving the first version of the second video stream and stop receiving the second version of the second video stream. Further, after receiving the user interaction, the application can stop receiving the first version of the first video stream and start receiving the second version of the video stream.

Other aspects of the invention include corresponding systems and computer-readable media. The various aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Figure 1:
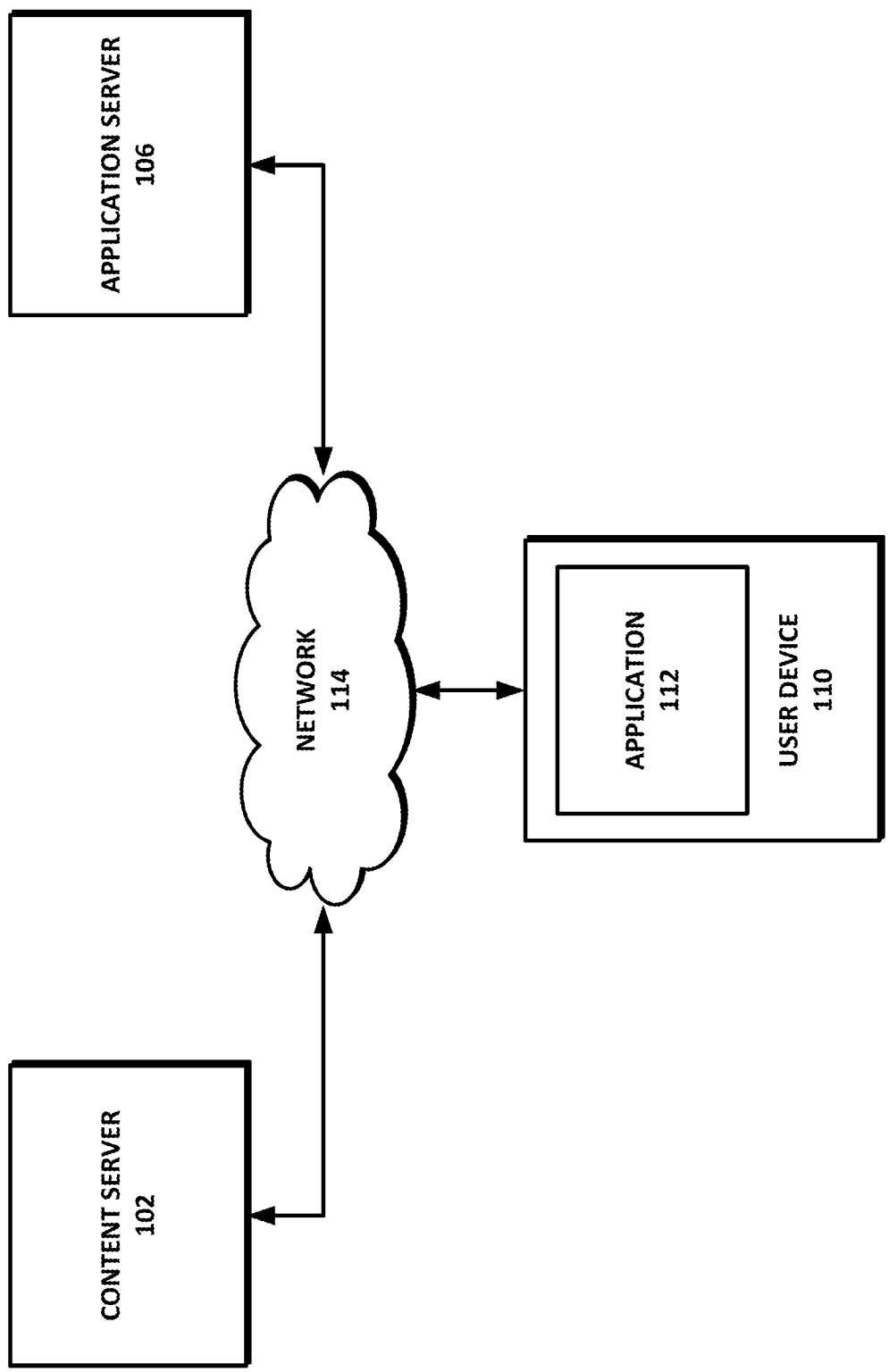
FIG. 1 is a high-level diagram of a system architecture according to an implementation.

Described herein are various implementations of methods and supporting systems for providing dynamic, real-time transitions among video streams in a video presentation. In some implementations, a video presentation includes multiple tracks or streams that a user can switch among in real-time or near real-time. In one implementation, the video presentation is an interactive video based on a video tree, hierarchy, or other structure. A video tree can be formed by nodes that are connected in a branching, hierarchical, or other linked form. Nodes can have an associated video segment, audio segment, graphical user interface elements, and/or other associated media. Users (e.g., viewers) can watch a video that begins from a starting node in the tree and proceeds along connected nodes. Upon reaching a point where multiple video segments branch off from a currently viewed segment, the user can interactively select the branch to traverse and, thus, the next video segment to watch. Branched video can include seamlessly assembled and selectably presentable multimedia content such as that described in U.S. patent application Ser. No. 13/033,916, filed on Feb. 24, 2011, and entitled "System and Method for Seamless Multimedia Assembly," and U.S. patent application Ser. No. 14/107,600, filed on Dec. 16, 2013, and entitled "Methods and Systems for Unfolding Video Pre-Roll," the entireties of which are hereby incorporated by reference.

The prerecorded video segments in a video tree can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in various manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles, preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments form a seamless multimedia content path, and users can take multiple paths and experience a complete, start-to-finish, seamless presentation. Further, one or more multimedia segments can be shared among intertwining paths while still ensuring a seamless transition from a previous segment and to the next segment. The content paths can be predefined, with fixed sets of possible transitions in order to ensure seamless transitions among segments. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. The display can hover and then disappear when the decision period ends or when an option has been selected. Further, a timer, countdown or other visual, aural, or other sensory indicator can be presented during playback of content segment to inform the user of the point by which he should (or in some cases must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

The segment that is played after a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video can continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

The techniques described herein can be implemented in any appropriate hardware or software. If implemented as software, the processes can execute on a system capable of running one or more commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented on a general purpose computing device in the form of a computer including a processing unit, a system memory, and a system bus that couples various system components including the system memory to the processing unit.

Referring to FIG. 1, the multimedia content described herein can be presented to a user on a user device 110 having an application 112 capable of playing and/or editing the content. The user device 110 can be, for example, a smartphone, tablet, laptop, palmtop, wireless telephone, television, gaming device, music player, mobile telephone, information appliance, workstation, a smart or dumb terminal, network computer, personal digital assistant, wireless device, minicomputer, mainframe computer, or other computing device, that is operated as a general purpose computer or a special purpose hardware device that can execute the functionality described herein.

The described systems can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

The application 112 can be a video player and/or editor that is implemented as a native application, web application, or other form of software. In some implementations, the application 112 is in the form of a web page, widget, and/or Java, JavaScript, .Net, Silverlight, Flash, and/or other applet or plug-in that is downloaded to the device and runs in conjunction with a web browser. The application 112 and the web browser can be part of a single client-server interface; for example, the application 112 can be implemented as a plugin to the web browser or to another framework or operating system. Any other suitable client software architecture, including but not limited to widget frameworks and applet technology can also be employed.

Multimedia content can be provided to the user device 110 by content server 102, which can be a web server, media server, a node in a content delivery network, or other content source. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/ or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Figure 2A:
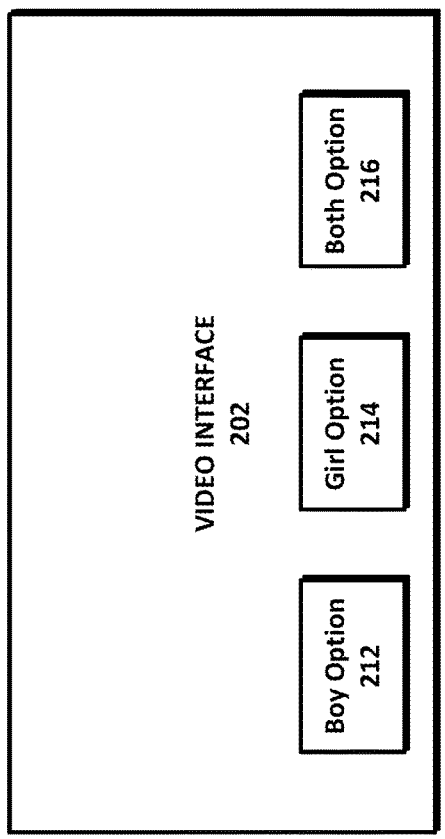
FIG. 2A is a diagram of an example video interface for switching among parallel tracks.
Figure 2B:
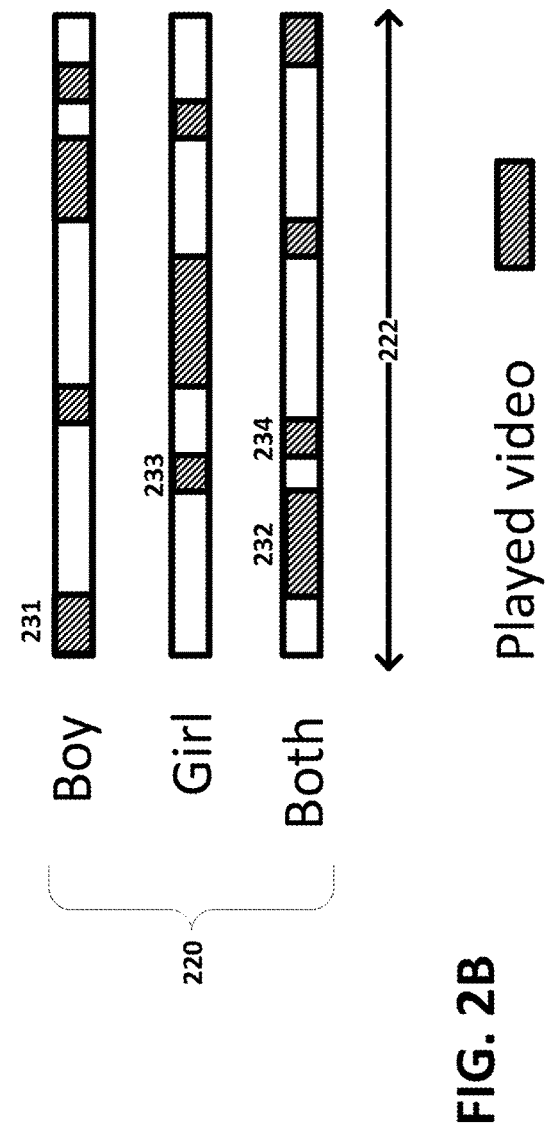
FIG. 2B is a diagram illustrating played video among three parallel tracks over a common timeline.

Referring to FIGS. 2A and 2B, in one implementation, during a video presentation a user can switch to parallel points in time among parallel video tracks 220. For example, during playback of a video, a user can interact with video interface 202 to select a video of a boy singing (using option button 212), then switch to a video of a girl singing the same song (using option button 214), and then switch to both of them singing together (using option button 216). At each point where the user is able to switch to the parallel track, the switch can be made seamlessly and substantially instantaneously, such that the audio/video of the song can continue without any perceptible delays, gaps, or buffering.

As shown more specifically in FIG. 2B, the "boy," "girl," and "both" tracks 220 are of common length and run parallel to each other during playback of the video along timeline 222. This example depicts the video played (i.e., the particular track selected at each point in the timeline 222) over the length of the parallel tracks 220. Playback begins in the "boy" track during time period 231 and then switches (either automatically or based on a user interaction) to the "both" track during the following time period 232. During the next period 233, the "girl" track is played, then playback returns to the "both" track during period 234, and so on, as shown.

Figure 2C:
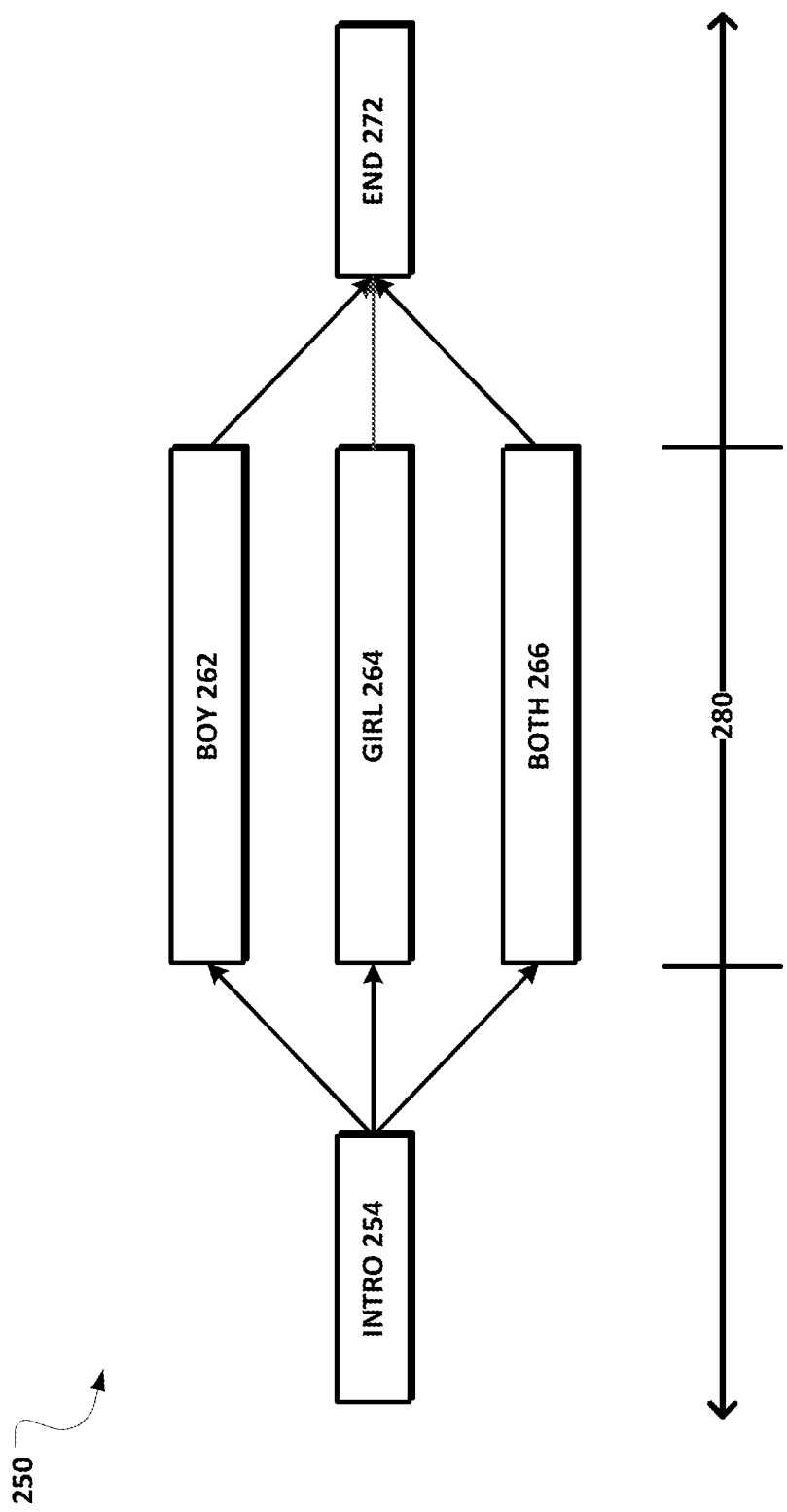
FIG. 2C is a diagram illustrating an example video tree structure including parallel tracks.

FIG. 2C depicts how the video presentation described above can be represented as a structure 250 having parallel tracks 262, 264, 266 corresponding to the videos of the boy, girl, and both, respectively. In this example, playback of the video begins with a common introduction segment 254, proceeds to the section with parallel tracks 262, 264, 266, and finishes with a common closing segment 272. In this example, during playback of the video presentation, a user can switch to any track that is parallel to the user's currently playing track (i.e., that overlaps the currently playing track with respect to a timeline 280 adhered to by the segments of the video presentation). In some implementations, the user can switch between parallel tracks at any point during playback of a particular parallel track. In other implementations, the user can only switch between tracks at predefined points during the playback of a particular parallel track.

Figure 3:
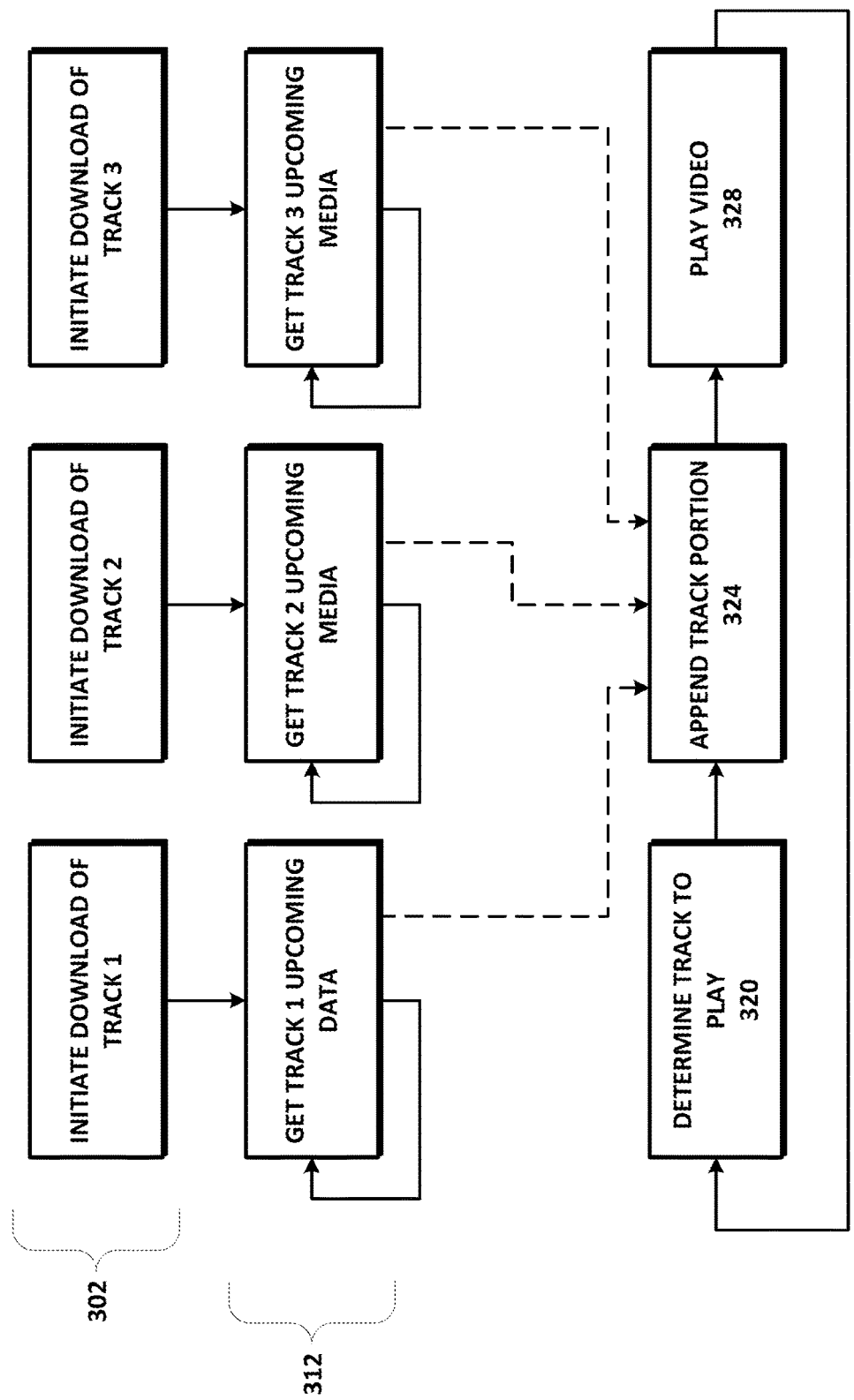
FIG. 3 is a flowchart illustrating an example method for providing parallel tracks in a media presentation, according to an implementation.

Referring now to FIG. 3, to facilitate near-instantaneous switching among parallel tracks, multiple media tracks (e.g., video streams) can be downloaded simultaneously to a user's device 110. Upon selecting a streaming video for playback, an upcoming portion of the video stream is typically buffered by a video player prior to commencing playback of the video, and the video player can continue buffering as the video is playing. Accordingly, in one implementation, if an upcoming segment of a video presentation (including the beginning of the presentation) includes two or more parallel tracks, the application 112 (e.g., a video player) can initiate download of the upcoming parallel tracks (in this example, three tracks) substantially simultaneously (STEP 302). The application 112 can then simultaneously receive and/or retrieve video data portions of each track (STEP 312). The receipt and/or retrieval of upcoming video portions of each track can be performed prior to playback of any particular parallel track as well as during playback of a parallel track. The downloading of video data in parallel tracks can be achieved in accordance with smart downloading techniques such as those described in U.S. Pat. No. 8,600,220, issued on Dec. 3, 2013, and entitled "Systems and Methods for Loading More than One Video Content at a Time," the entirety of which is incorporated by reference herein.

Upon reaching a segment of the video presentation that includes parallel tracks, the application 112 makes a determination of which track to play (STEP 320). The determination can be based, for example, a decision made or option selected by the user during playback of a previous video segment, during a previous playback of the video presentation, prior to video playback, and so on. In other instances, the determination is made automatically, on a random, rotating, or other basis. In STEP 324, based on the determined track to play, the application 112 appends a portion of the video data from the determined track to the current video being presented. The appended portion can be in temporal correspondence with an overall timeline of the video presentation. For example, if two parallel tracks are 30 seconds long and begin at the same time, a switch from the first track (e.g., at 10 seconds in) to the second track results in playback continuing with the second track video at the same point in time (i.e., at 10 seconds in). One will appreciate, however, that tracks can overlap in various manners and may not correspond in length. Following the appending, playback of the video continues using the appended video data from the determined track (STEP 328). During or after playback of the appended portion, the determined track can be reevaluated to determine if the same or a different track should be presented (return to STEP 320).

Figure 4:
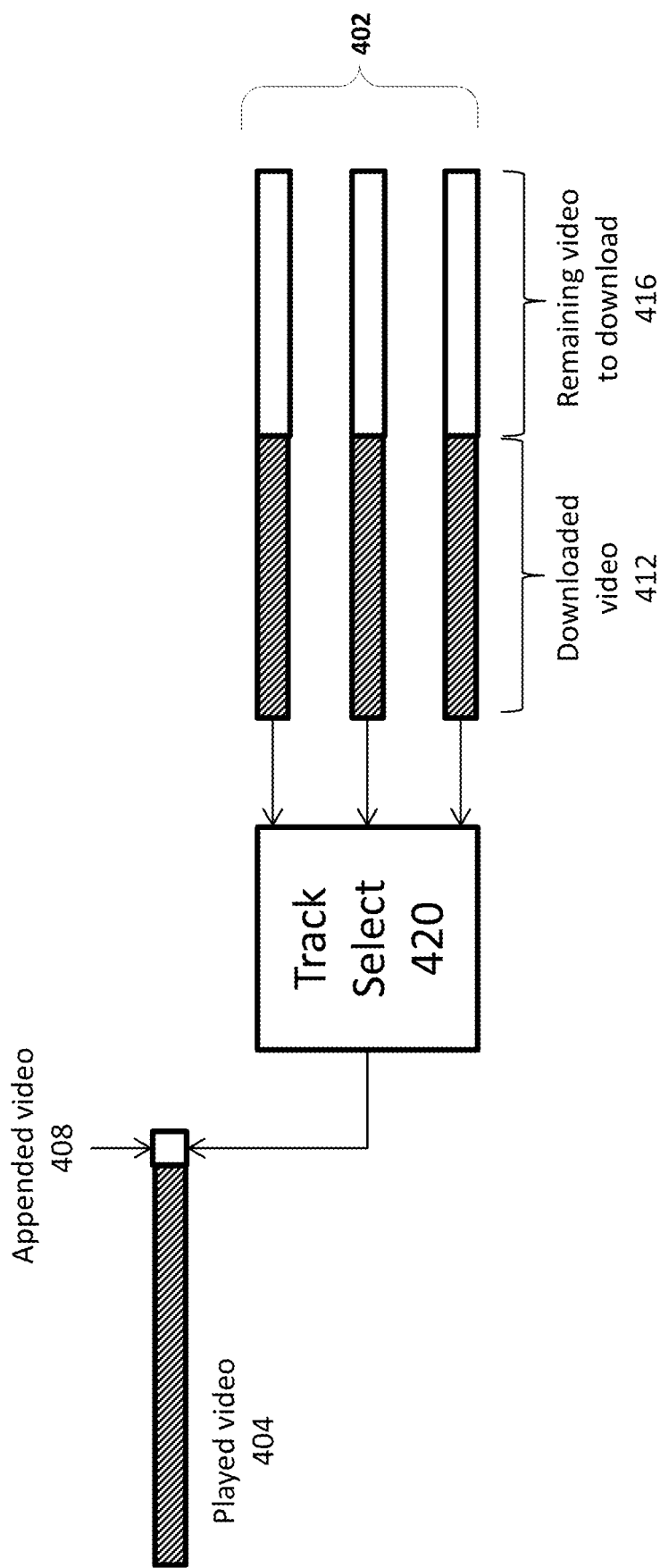
FIG. 4 is a diagram illustrating an appending of a video portion from one of a number of parallel tracks.

FIG. 4 provides an abstracted visual representation of the process in FIG. 3. Specifically, three parallel tracks 402 of the same length are simultaneously downloaded, and, in this example, each of the tracks 402 has been downloaded approximately in the same amount (represented by downloaded video 412), with approximately the same amount of each track to be downloaded (represented by remaining video to download 416). The video player or other application includes a function 420 that determines which track should be selected and played, and a portion 408 of the selected track is appended to the currently playing video, after the played video 404 up to that point.

In one implementation, the appended portion 408 is relatively short in length (e.g., 100 milliseconds, 500 milliseconds, 1 second, 1.5 seconds, etc.). Advantageously, the short length of the appended portion 408 provides for near-instantaneous switching to a different parallel track. For example, while the video is playing, small portions of the selected parallel track are continuously appended onto the video. In one instance, this appending occurs one portion at a time and is performed at the start of or during playback of the most recently appended portion 408. If a determination is made that a different parallel track has been selected, the next appended portion(s) will come from the different track. Thus, if the appended video portion 408 is 500 milliseconds long and a selection of a different track is made at the start of or during playback of the portion 408, then the next portion from the different track will be appended on the video and presented to the user no more than 500 milliseconds after the selection of the different track. As such, for appended portions of short length, the switch from one parallel track to another can be achieved with an imperceptible delay.

Figure 5:
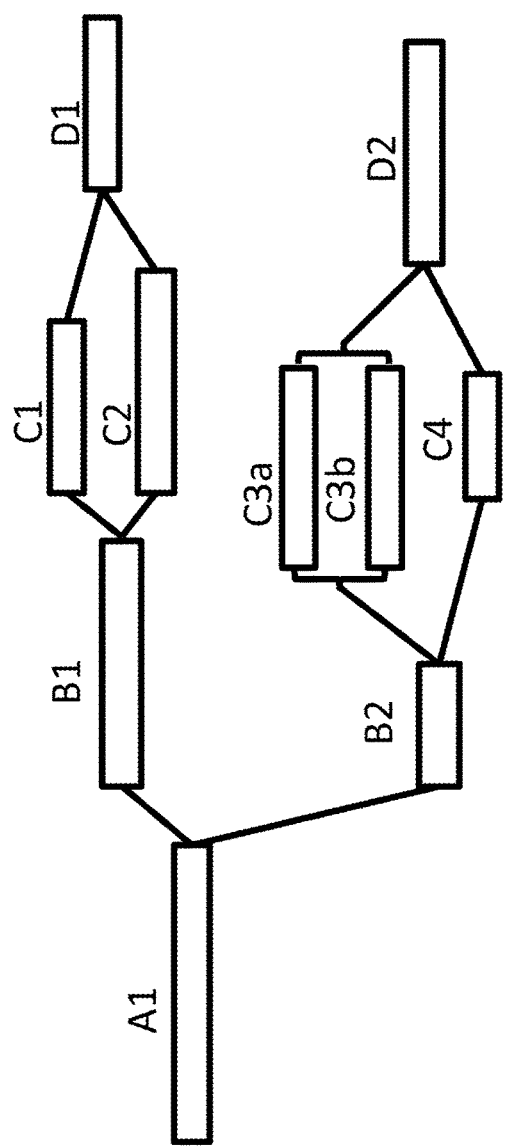
FIG. 5 is a diagram illustrating a video tree structure including a node with parallel tracks.

Parallel tracks can be included in branching video tree presentations such as those described above. Individual nodes of the tree can have two or more parallel tracks. For example, as shown in FIG. 5, segments C3a and C3b are parallel tracks of a single node, and a user can switch between the two segments during playback of the content of the node. In operation, a user can reach the parallel track node by selecting options during playback of the video presentation that take the user along the video tree path defined by A1 → B2 → (C3a, C3b). The (C3a, C3b) node is not a branching path of two different options; rather, at B2 the user makes (or the system automatically makes) a choice that will direct the user to either node (C3a, C3b) or C4. Once playback of node (C3a, C3b) begins, the user can then switch between the parallel tracks until playback of the node is complete. Playback then proceeds to node D2. In some implementations, whether playback of node (C3a, C3b) commences with the content of C3a or C3b depends on one or more choices previously made by a user, or can be random or otherwise automatically determined.

Figure 6:
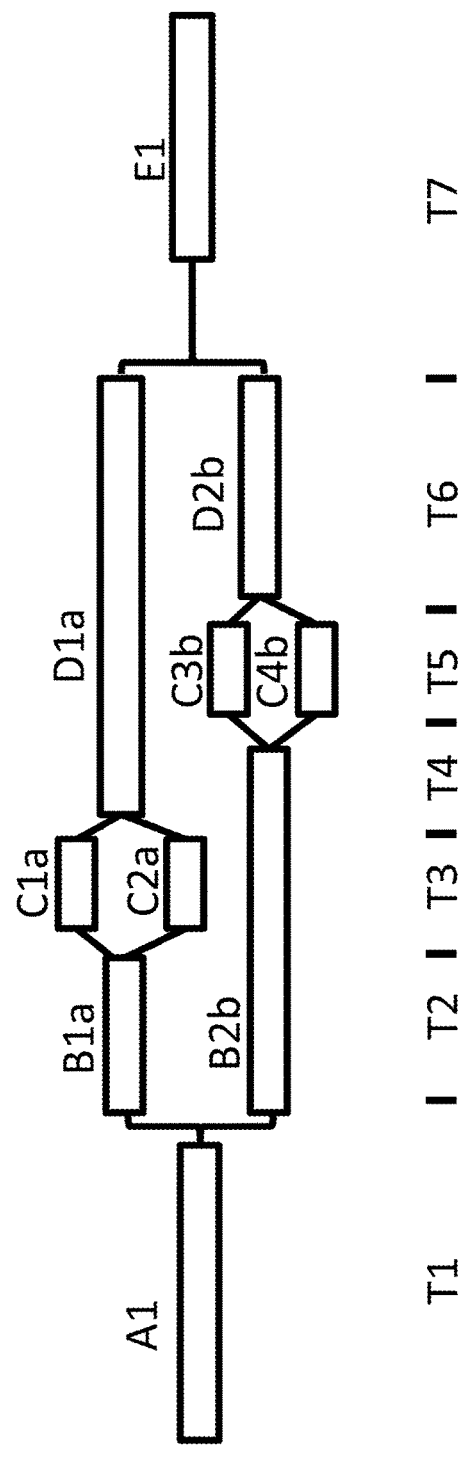
FIG. 6 is a diagram illustrating video tree branches with incorporated parallel tracks.

In other instances, a parallel track can incorporate a portion of a branch or an entire branch of the video tree. FIG. 6 depicts a video tree with four branches, each starting with node A1 and ending with node E1. The intermediate portions of each branch are: (1) B1a→C1a→D1a; (2) B1a→C2a →D1a; (3) B2b →C3b →D2b; and (4) B2b →C4b →D2b. The video tree also includes two parallel tracks: an upper track including branch portions (1) and (2), and a lower track including branch portions (3) and (4).

In one implementation, whereas a user can freely switch among parallel tracks during playback of the video presentation, he cannot switch between options of a branch. Rather, playback of a particular branched node can be constrained by choices made the user (or made automatically for the user) prior to or during playback of the video presentation. Thus, in the present example, playback of the video can proceed as follows. During T1, all users are shown video segment A1. At the beginning of time T2, the user enters the parallel track portion of the presentation and, during time T2, the user can freely alternate between B1a in the upper track and B2b in the lower track. At the end of T2, there is a branching point in the upper track (C1a or C2a). A decision period can be provided during the playback of B1a and/or B2b that gives the user the option to select between the two nodes C1a and C2a. If the decision period only occurs in the upper track, and the user is viewing the lower track during that period, an automatic selection of a node C1a or C2a can be made. Regardless, during time T3, the user can freely switch between B2b in the lower track and whichever branch option C1a or C2a was selected. In other words, if C1a was manually or automatically selected, the user can switch between C1a and B2b whereas, if C2a was selected, the user instead can switch between C2a and B2b. Playback of the video presentation through T7 then proceeds in a similar manner. Various forms and combinations of parallel tracks incorporating individual nodes and branches are contemplated.

In one implementation, to support parallel tracks in branched video, the application 112 provides multiple sets of interactive controls (e.g., graphical user interface buttons). The controls can be a combination of those described herein; for example, the controls can include a first set of interface elements that allows the user to switch among parallel tracks and a second set of interface elements that allows a user to make choices that determine the path the user will traverse through the branching video presentation. In some instances, the first set of interface elements includes sub-controls that allow the user to switch individually the audio, video, subtitle, or other components to a different track. Other interface elements can include, for example, a dynamic progress-bar that shows the user's path through the tree structure, such as that described in U.S. patent application Ser. No. 13/622,795, filed on Sep. 19, 2012, and entitled "Progress Bar for Branched Videos," the entirety of which is incorporated by reference herein. Playback controls can also be included, such as start, stop, rewind, fast forward, pause, volume control, and so on. If the user seeks forward or backward along the presentation timeline shared by the parallel tracks, the tracks can remain synchronized to the timeline and each other. Further, when seeking backward on a parallel track, the seek can remain on the current track or follow the path that was previously played. In some instances, the user can control the path of the seek by, for example, dragging a time marker on the timeline along a particular path of the branching structure. In one implementation, a restart control allows the user to start the entire media presentation over on demand.

As a user makes decisions and/or switches among parallel tracks during playback of a media presentation, the system can record each user interaction and/or the results thereof on the playback of the presentation. For example, the system can record each parallel track switch that the user makes with respect to time of switch and track selected, and save the recorded information in a format that can later be used by the system to reproduce the track selections as a passive version of the video. The user can then share his version of the video with others via a social medium or other means of communication by providing them with the recorded information. An example list of recorded information from a video having parallel tracks A, B, C, and D is as follows:

0:00 Video A
0:04 Video B
0:05 Video D
0:13 Video A
0:43 Video C
1:12 Video B
1:25 Video D where the first column of data is the timestamp of the switch and the second column of data is the track that should be played starting at the corresponding timestamp.

The present system can also collect and store statistics related to user interactions and decisions made during playback of a video presentation. Collected statistics can include, but are not limited to, the number of times switched to a particular track; the total time spent on a particular track; the shortest time spent on a particular track; the longest time spent on a particular track; the average time spent on a track; the most popular track according to choices (e.g., number of selections, time spent on a track) made by the user, the user's friends or connections, or a group of users; and the least popular track according to choices (e.g., number of selections, time spent on a track) made by the user, the user's friends or connections, or a group of users. For example, if four contestants are singing the same song in a video, with each singer shown on a different track, the system can identify the favorite singer of a user by calculating which track the user viewed the most. Collected statistics can also include those described in U.S. patent application Ser. No. 13/034,645, filed on Feb. 24, 2011, and entitled "System and Method for Data Mining within Interactive Media," the entirety of which is incorporated by reference herein.

In some implementations, a switch among parallel tracks can be made at any time during playback. In such cases, the switch can be seamless with respect to the technology (i.e., no noticeable jumps, gaps or buffering in transitioning from one media segment to another), but are not necessarily seamless with respect to the media content (i.e., there can be a noticeable change in audio, video, and/or other content from one track to another). However, a switch among such tracks can be made to appear content-seamless by providing a transition between tracks that can differ based on the source and/or destination track. A number of examples of the foregoing track transitions will now be described.

Figure 7A:
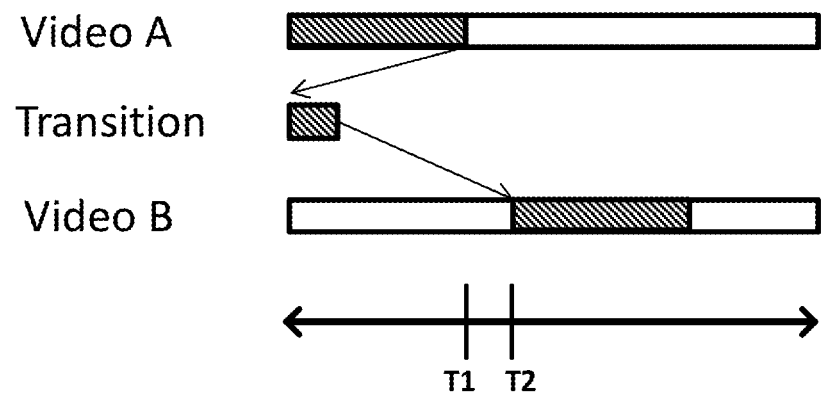
FIGS. 7A-7F are diagrams depicting various implementations of transitions between parallel tracks.

FIG. 7A depicts an example of a constant transition (such as a short video of a shutter, company logo, etc., an animation, flash, graphical effect, or other visual change), that can be presented between tracks when a user switches from one track (Video A) to another track (Video B). In this example, the user selects at time T1 to switch from Video A to Video B. Prior to starting playback of Video B at time T2, a transition of length T2−T1 is shown to the user. In other instances, the length of the transition does not determine the starting time point of the switched-to track. For example, Video B can start playback at time T1 after the transition completes.

Figure 7B:
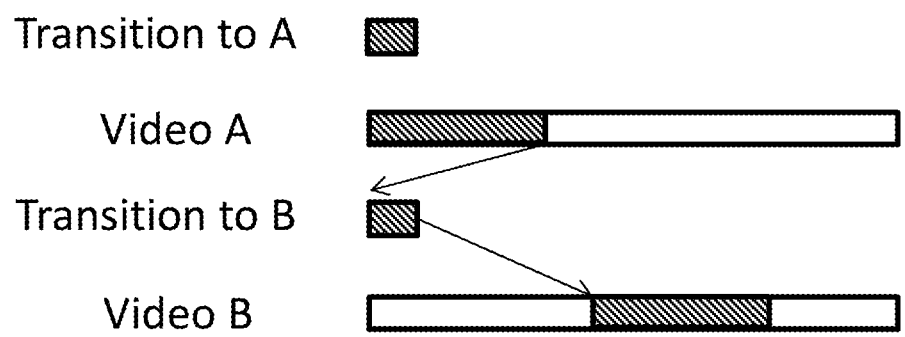

FIG. 7B illustrates an implementation in which a transition is associated with a particular track. If a user switches to a track having an associated transition, the user will be shown that transition regardless of the previous track. Thus, if the user switches from Video A to Video B, he will be shown the Transition to B segment. Were the user to switch from another track (e.g., Video C, not shown) to Video B, the user would again be shown the Transition to B segment. In one illustrative example, the video presentation includes news segments, and the transition video associated with a track is an introduction to a particular topic. Thus, if a user switches from a world news track to a sports news track, a transition video can be shown between the tracks in which a broadcaster states, "And now, for sports."

Figure 7C:
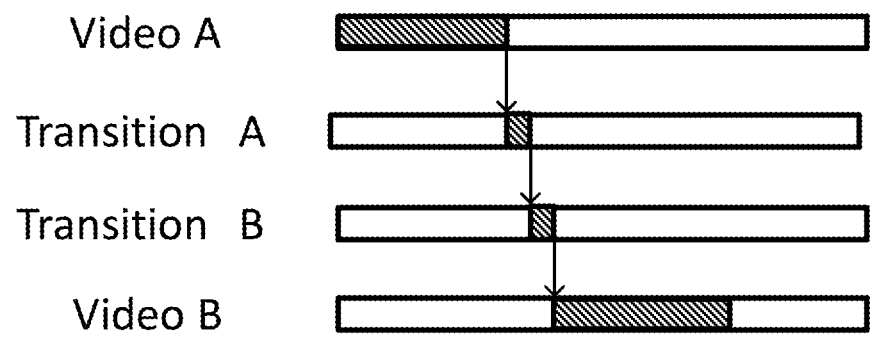

In other implementations, a track can have a specific associated transition that is played when the user is switching away from that track. For example, as shown in FIG. 7C, when switching from the Video A track to the Video B track, Transition A associated with Video A is presented. Further, Transition B, associated with the action of switching to the Video B track, is shown after Transition A and prior to Video B. In further implementations, a track can have both of the foregoing types of associated transitions (i.e., transition when arriving at the track and transition when leaving the track). There can also be multiple transitions associated with a track from which one or more particular transitions can be selected for presentation (e.g., by random selection). In one example of a video with intro and outro transitions, a user is shown a video with four dancers sitting on the floor. When the user selects one of the dancers (i.e., a dancer associated with a particular track), an intro transition video that shows the dancer standing up is presented. The track then proceeds with that dancer performing a routine. If the user selects a second dancer (i.e., switches to another track), an outro transition showing the first dancer sitting down is presented, followed by an intro transition showing the second dancer getting up. The video can then continue playing with the second dancer track.

Figure 7D:
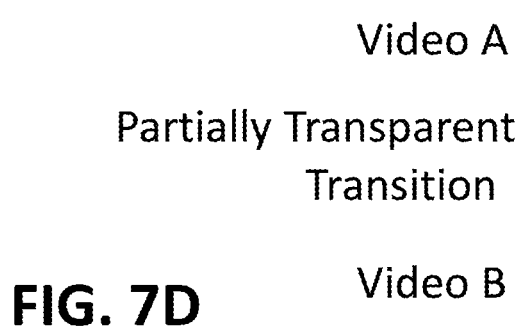
Figure 7D:
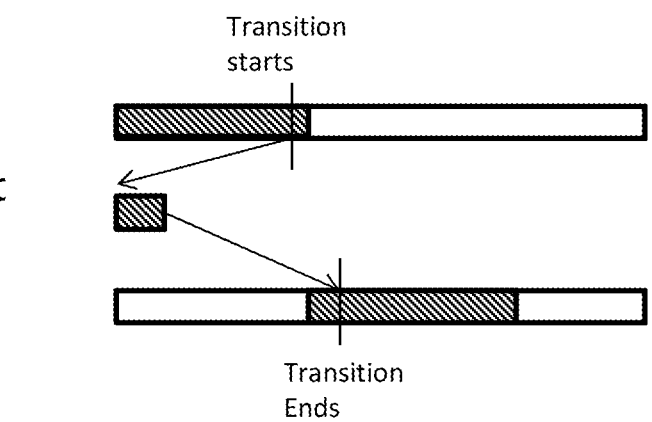

In another implementation, a transition segment can be partially transparent, in the case of video, or fade in/out, in the case of audio. As shown in FIG. 7D, a transition between Video A and Video B can partially overlap the end of Video A and the beginning of Video B. For example, when a user selects to transition from Video A to Video B, the transition begins substantially instantaneously and overlaps in a partially transparent manner the playback of Video A, which can continue for a bit longer (e.g., 1-3 seconds). The transition video can have an intermediate portion in which there is no transparency effect, or can continue at a constant or varying degree of transparency over its entire playback. Prior to the transition video concluding, Video B commences playback. The transition video can conclude in a partially transparent state, proceeding to full transparency during the overlapping portion with Video B. For example, the partially transparent transition video can be a camera shutter closing on Video A and opening with Video B. In one example of the above, a song in a video is performed in two different styles, each associated with a different track. To avoid a transition that does not appear seamless when moving between tracks, a transition video can be provided that causes the video on the first track to dissolve and its audio gradually to fade out and, then, causes the video on the second track to appear and its audio to gradually fade in.

Figure 7E:
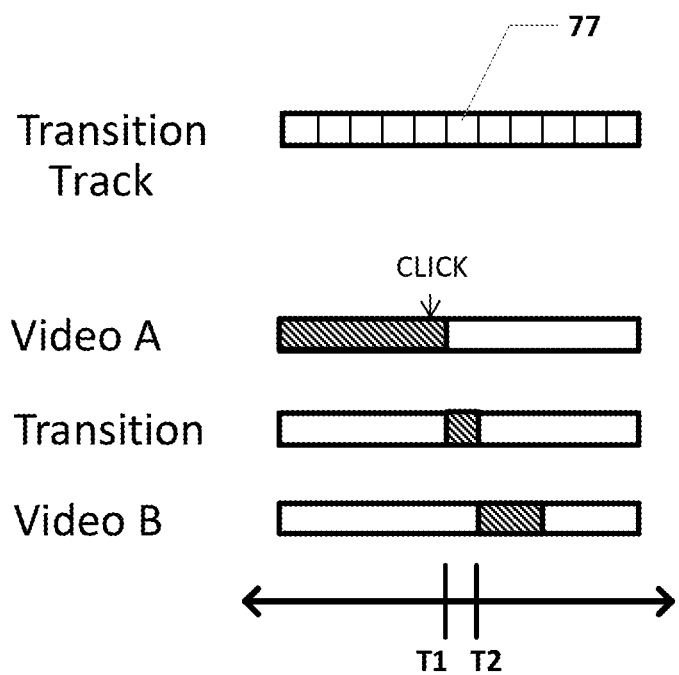

FIG. 7E depicts a "transition" track that includes media segments similar to other tracks described herein but is not directly accessible to the user. The transition track can be associated with one or more tracks and can include one or more transition segments that each start at a particular time with respect to the video presentation timeline or a timeline of an associated track. When a user interacts with the video to cause a switch from the Video A track to the Video B track (here, the user clicks just prior to T1), the system waits for the start of the next transition segment in the track (here, transition segment 77 at time T1). The transition segment 77 is then presented prior to switching to Video B. Advantageously, the transition track can include transition segments that are constructed to provide desirable transitions from one track to another at the particular points in time in the video associated with each transition segment.

Figure 7F:
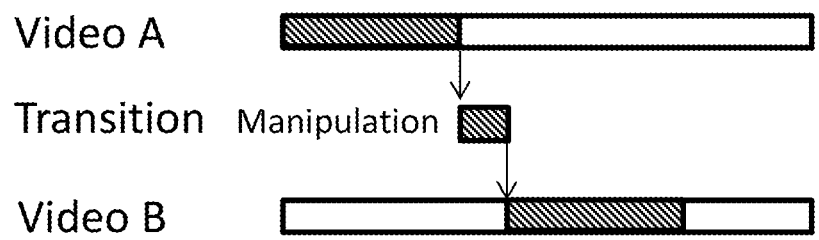

In some implementations, "on-the-fly" transitions are automatically created as a user switches from one track to another. For example, as shown in FIG. 7F, a transition can be created between the Video A and Video B tracks that manipulates the content of each. Example manipulations can include fade, shutter, blur, scramble, slide, squirm, explode, grow, shrink, and other effects. The transition between the tracks can be selected randomly or can be preset by an editor of the video presentation.

Figure 8:
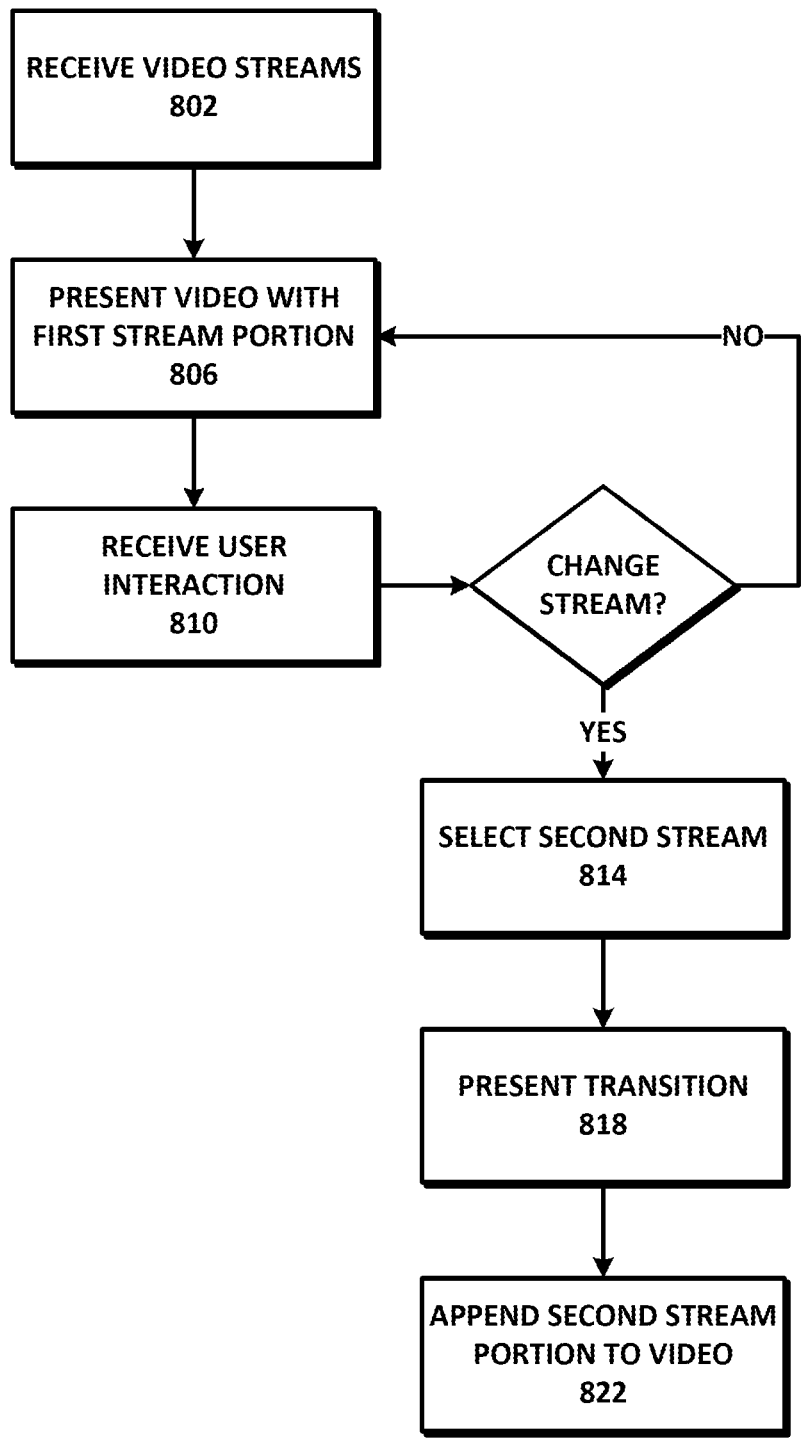
FIG. 8 is a flowchart depicting an example method for providing a transition between parallel tracks.

FIG. 8 depicts an example method for providing a transition among parallel tracks of a media presentation. In STEP 302, a plurality of video streams are simultaneously received by the application 112. Each stream can be made up of individual portions that are combinable to form coherent video data. The application 112 presents a video to a user that includes a first portion of a first video stream (STEP 306). For example, the video can start on a first track by presenting the video from the first video stream to the user. Prior to the conclusion of the first portion, the application 112 appends a second portion of the first video stream to the video. As described above, each portion can be approximately one second or less. Then, prior to the conclusion of playback of the second portion, the application 112 receives a user interaction (e.g., a click, key press, gesture, tap, or other manipulation of a user interface element on the video or application 112) (STEP 310). If the user interaction indicates that the video should be switched to a different, second track, the appropriate video stream associated with the second track is selected (STEP 314). In STEP 318, a transition segment is presented between the first and second tracks. A portion of the second track video stream is appended to the video (STEP 322), and playback of the video continues with that video stream.

In one implementation, the techniques described herein provide for a video presentation that has standard definition (SD) and high definition (HD) video tracks (and/or tracks of other video resolutions) that can be seamlessly switched among with no perceptible interruption between tracks. To accomplish this while avoiding the need to simultaneously download or download in advance multiple HD video or other bandwidth intensive data streams, the application 112 can preload the HD version of the currently viewed video track and the SD versions of other video tracks.

Figure 9A:
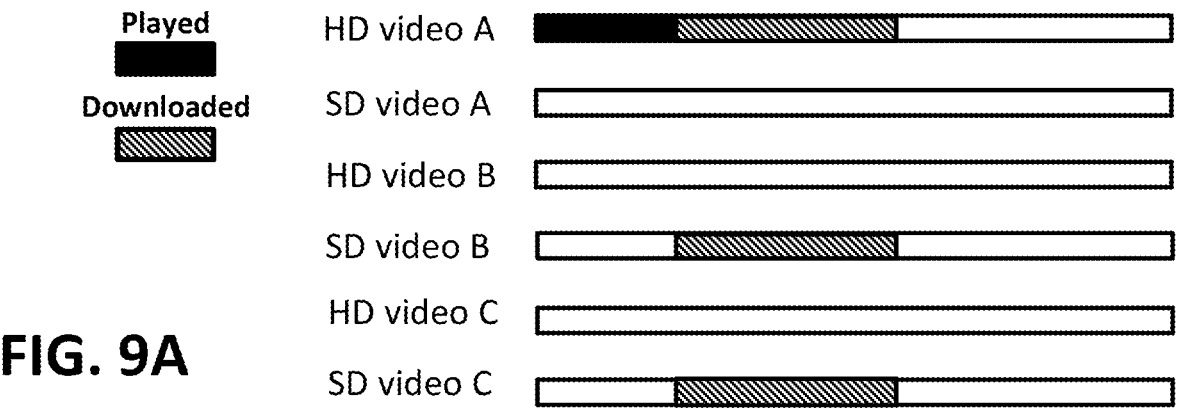
FIGS. 9A-9C are diagrams illustrating example buffering and playback of standard and high definition video in parallel tracks.
Figure 9B:
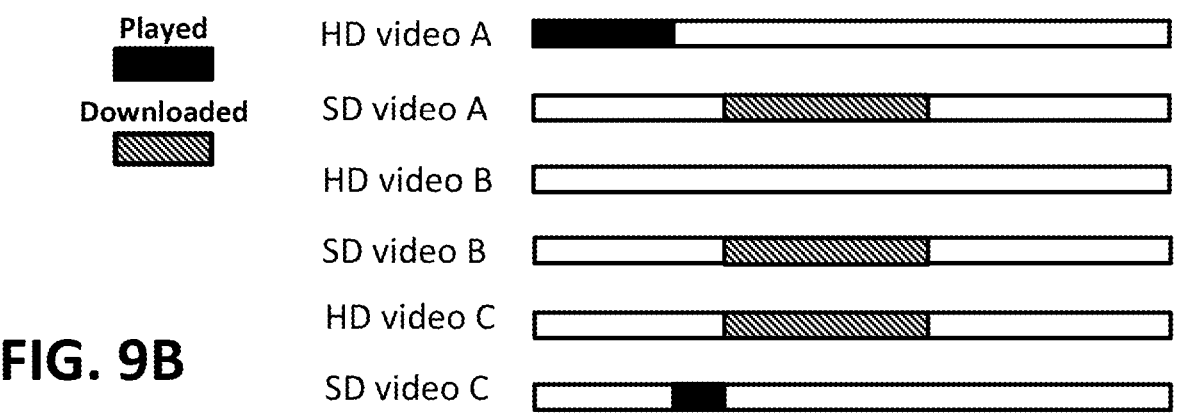
Figure 9C:
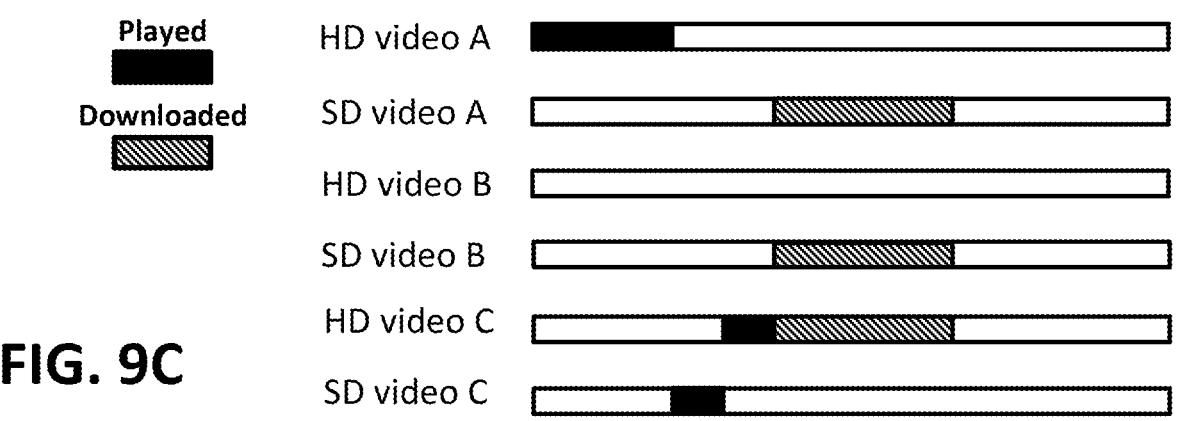

As shown in FIG. 9A, a video presentation shown to a user can include three tracks (videos A, B and C), with each track having an HD version and an SD version. The currently viewed track is the HD version of video A and, as such, the system continuously preloads (e.g., downloads and buffers) HD video A as well as the SD versions of the B and C tracks, in case the user desires to switch from track A to a different track. When a switch to a different track occurs, no HD video for the different track has been buffered, thus, the SD version is initially shown. For example, referring now to FIG. 9B, when the user switches to track C, the SD video C content is initially presented, and the corresponding HD video C content starts buffering. Further, the downloading of other HD video (i.e., HD video A) stops, and the downloading of the SD version of the previous track (i.e., SD video A) begins. SD video B continues to be downloaded. As shown in FIG. 9C, after enough of HD video C has been downloaded, the video can automatically switch to the HD version of track C. At that point, the downloading of SD video C can cease, and the downloading of HD video C, SD video A, and SD video B can continue until another switch occurs.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A method comprising:
    downloading simultaneously over a network to a user device at least two video streams, each stream comprising a plurality of portions, wherein the video streams are synchronized to a common timeline and are configured to be switched among at any time to parallel points in time during playback thereof, wherein a first one of the video streams includes first video content depicting a first subject and a second one of the video streams includes second video content depicting a second subject, the first video content being different from the second video content, the first subject being different from the second subject;
    presenting a video structured as a video tree comprising a plurality of branches, each branch representing a path in the video tree and comprising a plurality of nodes each having associated video content, wherein a first one of the paths comprises the at least two video streams;
    after selecting the first path, presenting a portion of the first video stream;
    receiving a user interaction with respect to the video;
    based on the user interaction, selecting the second video stream;
    receiving, over the network, a transition video stream separate from the first and second video streams, the transition video stream including a plurality of transition videos each having a different start time in the common timeline;
    selecting a transition video from the plurality of transition videos based on a user interaction time on the common timeline at which the user interaction was received;
    continuing to present the portion of the first video stream until reaching the start time of the selected transition video;
    presenting, upon reaching the start time of the selected transition video, the selected transition video after the portion of the first video stream and before presentation of any of the second video stream, wherein the selected transition video includes video content linking the first subject depicted in the first video content to the second subject depicted in the second video content to provide a content-seamless transition between the first video stream and the second video stream; and
    presenting a portion of the second video stream.

2. The method of claim 1, wherein a length of a particular video stream portion is one second or less.

3. The method of claim 1, further comprising presenting a second transition video between the selected transition video and the portion of the second video stream, wherein the selected transition video is associated with the first video stream and the second transition video is associated with the second video stream.

4. The method of claim 1, wherein each of the video streams has an associated first version and second version, the first video stream being received comprising the first version of the first video stream, and each other video stream being received comprising the second version of that video stream.

5. The method of claim 4, wherein a particular first version of a video stream comprises a higher quality video stream and wherein a particular second version of a video stream comprises a lower quality video stream.

6. The method of claim 4, further comprising, subsequent to receiving the user interaction:
    commencing receipt of a first version of the second video stream; and
    discontinuing receipt of the second version of the second video stream.

7. The method of claim 4, further comprising, subsequent to receiving the user interaction:

discontinuing receipt of the first version of the first video stream; and commencing receipt of the second version of the first video stream.

8. The method of claim 1, wherein the plurality of transition videos includes (i) a first transition video having a first predefined start time with respect to the common timeline and (ii) a second transition video having a second predefined start time with respect to the common timeline, wherein the second predefined start time is later than the first predefined start time, and wherein selecting the transition video comprises:

determining that the user interaction time is after the first predefined start time but prior to the second predefined start time; and selecting, based on the determining, the second transition video.

9. The method of claim 1, wherein the first stream comprises a branching point from which a plurality of alternative nodes extend.

10. The method of claim 9, wherein, if the second stream is being presented at a time parallel to the branching point in the first stream, automatically selecting one of the alternative nodes.

11. The method of claim 9, further comprising permitting a user to switch between the second video stream and a first node of the alternative nodes, and restricting the user from switching between the second video stream and an alternative node other than the first node.

12. The method of claim 1, wherein downloading simultaneously over the network to the user device the at least two video streams comprises:

downloading simultaneously over the network to the user device a third stream, the third stream including third video content different from the first video content and the second video content, wherein the third video content depicts the first subject and the second subject.

13. A system comprising:

one or more computers programmed to perform operations comprising:

downloading simultaneously over a network to a user device at least two video streams, each stream comprising a plurality of portions, wherein the video streams are synchronized to a common timeline and are configured to be switched among at any time to parallel points in time during playback thereof, wherein a first one of the video streams includes first video content depicting a first subject and a second one of the video streams includes second video content depicting a second subject, the first video content being different from the second video content, the first subject being different from the second subject;

presenting a video structured as a video tree comprising a plurality of branches, each branch representing a path in the video tree and comprising a plurality of nodes each having associated video content, wherein a first one of the paths comprises the at least two video streams;

after selecting the first path, presenting a portion of the first video stream;

receiving a user interaction with respect to the video; based on the user interaction, selecting the second video stream;

receiving over the network a transition video stream separate from the first and second video streams, the transition video stream including a plurality of transition videos each having a different start time in the common timeline;

selecting a transition video from the plurality of transition videos based on a user interaction time of the video on the common timeline at which the user interaction was received;

continuing to present the portion of the first video stream until reaching the start time of the selected transition video;

presenting, upon reaching the start time of the selected transition video, the selected transition video after the portion of the first video stream and before presentation of any of the second video stream, wherein the selected transition video includes video content linking the first subject depicted in the first video content to the second subject depicted in the second video content to provide a content-seamless transition between the first video stream and the second video stream; and presenting a portion of the second video stream.

14. The system of claim 13, wherein a length of a particular video stream portion is one second or less.

15. The system of claim 13, wherein the operations further comprise presenting a second transition video between the selected transition video and the portion of the second video stream, wherein the selected transition video is associated with the first video stream and the second transition video is associated with the second video stream.

16. The system of claim 13, wherein each of the video streams has an associated first version and second version, the first video stream being received comprising the first version of the first video stream, and each other video stream being received comprising the second version of that video stream.

17. The system of claim 16, wherein a particular first version of a video stream comprises a higher quality video stream and wherein a particular second version of a video stream comprises a lower quality video stream.

18. The system of claim 16, wherein the operations further comprise, subsequent to receiving the user interaction:

commencing receipt of a first version of the second video stream; and discontinuing receipt of the second version of the second video stream.

19. The system of claim 16, wherein the operations further comprise, subsequent to receiving the user interaction:

discontinuing receipt of the first version of the first video stream; and commencing receipt of the second version of the first video stream.

20. The system of claim 13, wherein downloading simultaneously over the network to the user device the at least two video streams comprises:

downloading simultaneously over the network to the user device a third stream, the third stream including third video content different from the first video content and the second video content, wherein the third video content depicts the first subject and the second subject.

* * * * *